US011093379B2

(12) United States Patent
Duffy et al.

(10) Patent No.: US 11,093,379 B2
(45) Date of Patent: Aug. 17, 2021

(54) TESTING OF COMPLEX DATA PROCESSING SYSTEMS

(71) Applicant: Health Care Service Corporation, Chicago, IL (US)

(72) Inventors: Flavia Elia Pistone Duffy, Chicago, IL (US); John Francis Ashman, Evanston, IL (US)

(73) Assignee: Health Care Service Corporation, Chicago, IL (US)

( * ) Notice: Subject to any disclaimer, the term of this patent is extended or adjusted under 35 U.S.C. 154(b) by 107 days.

(21) Appl. No.: 16/518,676

(22) Filed: Jul. 22, 2019

(65) Prior Publication Data

US 2021/0026761 A1 Jan. 28, 2021

(51) Int. Cl.
*G06F 11/00* (2006.01)
*G06F 11/36* (2006.01)

(52) U.S. Cl.
CPC ...... *G06F 11/3692* (2013.01); *G06F 11/3688* (2013.01)

(58) Field of Classification Search
CPC ............................ G06F 11/368; G06F 11/3692
See application file for complete search history.

(56) References Cited

U.S. PATENT DOCUMENTS

| 8,418,000 | B1 | 4/2013 | Salame |
| 8,429,618 | B2 | 4/2013 | Hogan |
| 9,858,175 | B1 | 1/2018 | Raghavan |
| 9,898,396 | B2 | 2/2018 | Owen |
| 2006/0010426 | A1 | 1/2006 | Lewis |
| 2007/0265883 | A1 | 11/2007 | Farris |

(Continued)

FOREIGN PATENT DOCUMENTS

| CN | 103530223 A | 1/2014 |
| CN | 105930277 A | 9/2016 |

(Continued)

OTHER PUBLICATIONS

Wikipedia. "Software Testing" obtained from https://en.wikipedia.org/wiki/Software_testing on Jul. 22, 2019. p. 1-24.

(Continued)

*Primary Examiner* — Jonathan D Gibson
(74) *Attorney, Agent, or Firm* — Lempia Summerfield Katz LLC

(57) ABSTRACT

A computer implemented method and system for testing complex data processing systems. A transaction processing testing system may identify test scenarios used to test a software system or application, such as a data processing system, in a modified state. The test scenarios may be based on actual historical data, selected and prioritized using natural language terms, provided to the data processing system and the results of the processing thereof by the data processing system. The testing system may then compare the results of processing one or more particular test scenarios by a modified version of the data processing system against the results of processing the same scenario(s) by the version of the data processing system prior to being modified to determine whether or not there are defects in the modified version. The testing may account for any expected differences between the results due to the modification(s).

24 Claims, 13 Drawing Sheets

(56) References Cited

U.S. PATENT DOCUMENTS

| | | |
|---|---|---|
| 2009/0018866 A1 | 1/2009 | Christen |
| 2011/0145653 A1 | 6/2011 | Broadfoot |
| 2013/0305081 A1 | 11/2013 | Agnihotram |
| 2014/0081652 A1 | 3/2014 | Klindworth |
| 2014/0379677 A1* | 12/2014 | Driesen ............... G06F 21/6227 707/704 |
| 2015/0127370 A1 | 5/2015 | Cornelis |
| 2015/0286556 A1* | 10/2015 | Ellis ................... G06F 11/3692 717/125 |
| 2017/0017760 A1 | 1/2017 | Freese |
| 2017/0139819 A1* | 5/2017 | D'Andrea ............. G06F 11/368 |
| 2019/0057014 A1* | 2/2019 | Shalev ................. G06F 11/368 |
| 2019/0354621 A1* | 11/2019 | Wang .................. G06F 16/2453 |
| 2020/0019493 A1* | 1/2020 | Ramakrishna ............ G06F 8/65 |
| 2020/0175336 A1* | 6/2020 | Eberlein ............. G06F 11/3692 |
| 2021/0026761 A1* | 1/2021 | Duffy ................. G06F 11/3688 |

FOREIGN PATENT DOCUMENTS

| | | |
|---|---|---|
| CN | 106909503 A | 6/2017 |
| CN | 107239798 A | 10/2017 |
| CN | 107870859 A | 4/2018 |
| CN | 108921710 A | 11/2018 |
| JP | 2012208830 A | 10/2012 |
| WO | WO2018222327 A1 | 12/2018 |

OTHER PUBLICATIONS

Edward Frees et al., "Multivariate Frequency-Severity Regression Models in Insurance", Risks, Feb. 25, 2016, vol. 4, No. 1.

International Search Report and Written Opinion, from PCT/US2020/41556, dated Nov. 10, 2020, WO.

S Yoo et al., "Regression Testing Minimization, Selection, and Prioritization: a Survey", Jan. 1, 2010, Software Testing, Verification & Reliability.

\* cited by examiner

TESTING OF COMPLEX DATA PROCESSING SYSTEMS

BACKGROUND

Software testing is a process by which a computer software program, e.g. a software product or service, or modifications thereto, is analyzed/reviewed in order to identify the correctness, completeness, and quality of the developed software product or service, and to evaluate the functionality of the software product or service to ensure that the software product or service can be implemented in a target environment with the desired functionality. Software testing typically includes a set of activities which are conducted in order to identify any errors in software products/services so that those errors can be corrected prior to the product/service being released to end users. Simply put, software testing is an activity undertaken to check that a software system is defect free and works as expected. Software testing can also provide an objective, independent view of the software to allow a business to appreciate and understand the quality of the software and the risks of software implementation, such as the risk of failure, to end users or other interested parties. Software testing is important because software defects can be expensive or even dangerous, e.g. they may potentially cause monetary and/or human loss.

Software testing can be conducted as soon as executable software or updates/modifications thereto, even if partially complete, exists. The overall approach to software development often determines when and how testing is conducted. However, software testing activities typically occur before a system, or a modification thereto, is implemented into a target environment. Software test techniques include the process of executing a program or application with the intent of finding software bugs (errors or other defects), verifying that the software operates as designed/expected and verifying that the software product or service is fit for use. Given the complexity of software systems, software testing may not necessarily establish that a product or service functions properly under all conditions, but instead may only establish that a product or service does not function properly under specific conditions. Generally, after a system, or modification thereto, is tested and put into a target environment, the system does not, again, undergo a complete functional test to ensure continued system stability. Rather, any future testing typically focuses on individual system components or functional segments that have caused a fault or are in the process of being modified or upgraded. A significant amount of testing and related reporting is required throughout each of these stages of a software system's development and continued use.

Software testing may involve the execution of a software component or system component to evaluate one or more properties of interest. In general, these properties indicate the extent to which the component or system under test (SUT) meets the requirements that guided its design and development, responds correctly to all, or selected, types of inputs, performs its functions within an acceptable time, is sufficiently usable, can be installed and run in its intended environments, and achieves the general result for which it was intended. The scope of software testing may also include examining code and executing code in various environments and conditions to determine whether the software system does what it is supposed to do and what it needs to do.

A fundamental problem with software testing is that testing under all combinations of inputs and preconditions (initial or current state) may not be feasible, even with a simple product. The number of possible test scenarios for even simple software components may be practically infinite. Therefore, software testing may involve some strategy to select tests which may be feasibly executed given the available time and resources. As a result, software testing typically attempts to execute a program or application with the intent of finding software bugs (i.e., errors or other defects), e.g., test scenarios are selected/designed based on specific purposes/aspects of the system under test, such as critical functions. The job of testing may be conducted as an iterative and or hierarchical process, since when one bug is fixed, it may illuminate other, deeper bugs, or can even result in new ones, e.g. fixing one bug introduces another, and it may be easier to test a large system by focusing on subsystems thereof, alone and/or in combination.

Current methods of software testing may require significant amounts of technical resources, such as software engineers and software coders, with the ability to prepare testing scenarios in one or more complicated software coding languages. Conventional testing methodologies identify critical functions or otherwise analyze the software system, such as the program code which implements the software system, to identify specific risk areas, such as areas of the program code which have been recently modified or critical areas of the program code. The software engineers and/or coders may, based on this review, then design a limited number of test scenarios for use in testing the system. A test scenario may be any functionality of a system under test that can be tested and may involve sequences of particular input combinations to the system along with a specification of the expected results to compare with the actual results. Because many of the testing scenarios may be written in varying forms of software coding languages, it can be difficult for a non-technical resource, such as an actual user of the system, to create testing scenarios or evaluate the efficacy or usefulness of testing scenarios.

Other problems related to software testing processes are inherent in large and extremely complex commercial software applications, such as complex data/transaction processing systems. In such complex systems, if the system is not sufficiently tested it may behave differently in the target environment than in the test environment, which may result in unexpected performance. As a result, complex systems often do not meet their stated objectives. Additionally, system failures may occur more frequently in complex systems as a result of failures that were not detected during the testing process, which may cause a partial or total loss of service to the end user. For businesses, this may result in decreased revenues from loss of services, increased expenses to repair the service, and a negative impact to customer service.

DETAILED DESCRIPTION

Figure 1A:
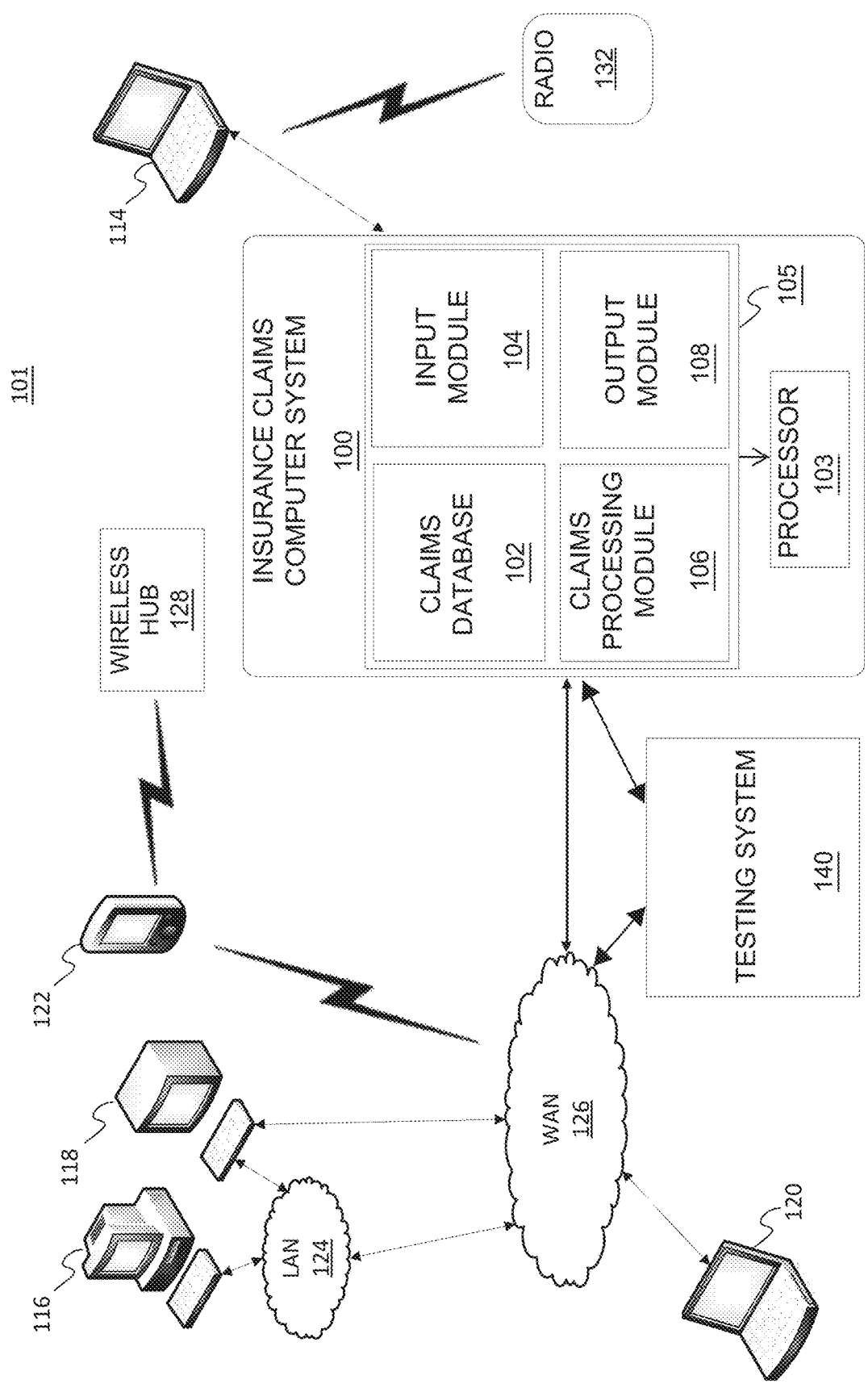
FIGS. 1A-B depict an exemplary system for generating a test for a transaction processing system.

The disclosed embodiments related to a system and method that can effectively evaluate, prioritize, and optimize software test coverage for complex systems that reduces cost and accelerates test cycle times. The disclosed embodiments further provide for greater insight and understanding into what will be, or has been, tested and allow non-technical resources to evaluate and prepare testing scenarios.

More particularly, the disclosed embodiments relate to an improved automated system for creating test scenarios for testing software applications or systems, such as a transaction processing system. A transaction processing system/application may involve individual software components or functional segments. These software applications or systems may be newly developed and/or updated from time to time. Newly developed software systems implemented into a target environment, or software systems as they exist prior to an update, may be referred to as being in a current, operating version or state. If the current operating version of a software system is to be updated, or modified, software testing may be performed on the modified version of the software system in order to identify any software bugs, such as errors or other defects, prior to releasing the updated software system to the target environment as the then current version. As will be discussed in detail, the results of processing a particular scenario by a modified version of a software system/application may be compared against the results, accounting for any expected differences therein due to the modifications, of processing that same scenario in the current, unmodified version to determine whether or not there are defects in the modified version.

Conventional software testing methodologies identify critical functions or otherwise analyze the transaction processing system, e.g. the program code which implements the transaction processing system, to identify specific risk areas, such as areas of the program code which have been recently modified, critical areas of the program code, etc. A limited number of test scenarios (sequences of particular input combinations) are then designed for testing the transaction processing system. This is referred to as a "bottom up approach" and is complex and data intensive. This process also requires significant technical knowledge of the system design and implementation to understand, for example, the program code and to identify areas of risk, critical and/or vulnerable functions and to design suitable tests.

In contrast, while conventional methods may be forward looking, the proposed embodiments are backward looking or otherwise employ a "top down approach." In particular, the disclosed embodiments use actual historical data provided to the system and the results of the processing thereof by the system to design a suite of test scenarios in a manner which may be simpler and less data intensive. This proposed method changes the manner in which data is processed, resulting in a functional improvement to software testing technology. In one embodiment, the proposed system provides an improved user interface which simplifies all of the variables in the historical data and allows a user to select or specify, such as by using a high-level description of a particular process or business pattern, e.g. using natural language, particular variables and values thereof, or groups thereof, which represent or otherwise abstract critical or specific areas or functions of the transaction processing system that are desired to be tested. In one embodiment, based on these selections, definitions and/or inputs, the proposed system then extracts historical input combinations, from prior transactions in the historical data, that include the values of the selected variables or otherwise are consistent with user selection/specification, along with the results of those prior transactions. These transactional pairs, or input combinations, of selected variables and corresponding values of historical data form the suite of test scenarios for testing the transaction processing system. This allows a test operator to use a "top down approach" to select critical input combinations to test, such as: combinations that the system has seen, and is expected to see, frequently; combinations that represent high value or cost to the business; or combinations that are specifically directed to a recently introduced/created, modified or otherwise critical portion of the transaction processing system. The proposed embodiments may further provide analytical functions to assess the test coverage, e.g. the degree to which the transaction processing system, i.e. all of the various functions thereof, is tested by the selected test scenarios, compare the test coverage or scope with other test scenario suites to determine a degree of overlap, if any, and compute a statistical measure of risk of failure, and/or severity thereof.

According to one embodiment, the interface for selecting the pairs of particular variables and values thereof in the historical data may involve a common, system agnostic "grammar" that may be used to describe, in business terms using natural language, a set of data that can be encountered by a software-based product. Natural language refers to ordinary language that arises in the interactions among human beings and is the language that human beings use to communicate with each other. Natural language may be distinguished from formal/constructed languages such as those used to program computers. This set of data may then form the basis of the suite of test scenarios. The business terms may not be approximations or subjective generalizations of data but may be mapped directly to actual technical data elements in the historical data. This allows the proposed system to leverage data visualization techniques to represent the data, and then present, e.g. substantially in real time, the narrative description of the visualization alongside it. In one embodiment, the grammar may be both human and machine readable at once and tailored specifically to describe the concept of test coverage. The proposed embodiments provide a specific manner of requesting data and formulating testing scenarios based on a natural language grammar used in queries, which provides a specific technical improvement over prior systems resulting in an improved user interface for designing a suite of test scenarios for testing software systems, e.g., the use of a natural language grammar in defining test scenarios is a specific improvement over prior art systems by allowing users to describe and request certain sets of data that is generally understood by business customers.

As indicated above, the degree to which a transaction processing system is tested may be referred to as test coverage. Conventionally, the concept of test coverage is often oversimplified and/or underemphasized, which creates a challenge. This challenge is amplified when a need exists to test large-scale custom or highly configured commercial off-the-shelf (COTS) solutions, many of which may have been developed over time with hand-offs and transitions, limited documentation, high complexity, multiple technical platforms, and massive amounts of transactions or records to accommodate. Especially relevant for large transformation efforts, the concept of test coverage becomes exponentially more difficult when there are millions-to-billions of data permutations and process paths that may be affected. Exemplary embodiments of the testing framework disclosed herein may plan and evaluate system test coverage based on value-driven patterns of operational impact. This approach may be additive to traditional Requirement, Process, Random Sample, or Code coverage methods for testing. In another embodiment, testing the transaction processing system may also include computing, based on when a fault is determined, a statistical measure of risk of failure of the transaction processing system in the modified state. The framework disclosed herein may utilize big data technologies, as will be discussed below, and may be referred to as the Big Data Analytics for Test (BDAT) framework.

The description of real or "production" data sets can then be evaluated to determine its priority in the context of the thoroughness or comprehensiveness of software testing coverage. The proposed system may automatically prioritize the selected test scenarios to determine what is the most important to cover. Using the prioritization results, the proposed system may align the software testing accordingly to optimally balance prioritized coverage with available time or resources. In other words, using the priority of the scenario, the proposed system may determine a right-sized amount of software testing to be done in order to manage the risk of missing impactful defects or bugs against the cost of exhaustively testing all possible permutations. Instead of attempting the infeasible, or spending time on non-impactful or redundant testing, the proposed system focuses first and foremost on that which is most relevant and important to the business customers or operations using the live transaction processing system.

In one embodiment, the disclosed transaction processing system may be a complex data processing system that processes large sets of multi-variate data, such as a health insurance claims processing system that processes a multitude of varied health care claims to determine an appropriate benefit to provide based on complex rules derived from health insurance policies and other contractual agreements, industry, legal and/or regulatory requirements, guidelines and or practices. As an example, a health care claim can include numerous fields of data, such as name, address, type of insurance, codes indicating health conditions, codes indicating procedures provided by a health care provider, etc., any of which, alone or in combination, may affect the provided benefit. A health insurance claims processing system may process millions of claims per month. It may not be possible to exhaustively test such a complex data processing system as the number possible input combinations coupled with the amount of time needed to test each combination make exhaustive testing impractical if not impossible. In this example, a user may, by providing a high-level description of a business pattern, e.g. high-risk pregnancies in southern states, select obstetric related claims submitted from the states south of interstate 80 by women of ages 35 and older. In one embodiment, the proposed system may then analyze the historical data containing claims previously processed by the health insurance claims processing system. The proposed system may then extract all prior claims, along with their outcomes, that meet the requirements and create a suite of test scenarios based thereon. To create the test scenarios that will be used to test the health insurance claims processing system, the extracted claims would be analyzed to identify high-value scenarios that maximize testing scope and coverage, such as to identify high dollar amount transactions (high payout claims) and/or high-volume transactions. The identified historical transactions then form the prioritized set of test scenarios. This prioritized set of test scenarios may then be used to test the health insurance claims processing system.

For example, over 20 million medical claims may be adjudicated by a health insurance claims processing system in a given month. The health insurance claims processing system may be updated, or modified, monthly. Testing monthly software changes to this system for each of those 20+ million instances of medical claims may not be feasible. However, by applying the proposed framework (i.e., BDAT framework) to this data, the proposed system can "translate" those 20+ million claims into a more manageable amount, such as approximately 24,000 unique scenarios, which forms the suite of possible test scenarios. The proposed system may then prioritize these test scenarios, such as based on urgency, priority and/or impact, into, for example, approximately 6,000 high business impact scenarios that cover 80% of the volume of total monthly claims and 80% of the highest average amounts per claim. The 6,000 high business impact scenarios can be broken into three categories, discussed in more detail below: high frequency & high severity, high frequency & low severity, and high severity & low frequency. The proposed system can then use those 6,000 high business impact scenarios as the basis to evaluate the testing coverage of the monthly claims processing software changes that are released, placing the most emphasis on ensuring test coverage in the high frequency & high severity category. Once an appropriate coverage is determined, test scenarios from the 6,000 high business impact scenarios may be chosen to test the health insurance claims processing system. In addition to the three categories of high business impact scenarios discussed above, there is also a fourth category of low frequency & low severity test scenarios defined as low business impact scenarios. These low business impact scenarios may be a low priority from a business perspective, but these scenarios may represent a significant portion of the "technical impact" scenarios, since the more scenarios that exist in a category, the more "paths" in a system are covered. For this reason, if a project or effort is making large-scale technical changes to a system, it may be advantageous for the scenarios in this fourth category to be covered as well.

The exemplary framework disclosed herein is unique in that it accomplishes the testing coverage needed without traditional, fully documented baselines of requirements, use cases, process models, or application code coverage—any of which are not normally or consistently available despite the constant need for testing coverage. The proposed system improves upon evaluating, prioritizing, and optimizing software test coverage, which increases efficiency and decreases costs associated with software testing. By analyzing actual historical data provided to the system and the results of the processing thereof by the system to design a suite of test scenarios, rather than specific program codes implemented in the software system, the proposed system may provide a simpler software testing process that is less data intensive as conventional methodologies. This provides a specific technical improvement over prior systems, resulting in an improved software testing system.

The ability to describe and select test scenario data at a logical level in business terms using natural language that is understandable to a business customer may improve the ability to prepare and limit testing scenarios for a nontechnical resource lacking competency in the software coding languages of the testing scenarios. Furthermore, the usage of grammar-based scenarios may enable software development and testing teams to not have to rely on production data copied into non-production environments, which may be a common approach to manage testing coverage in highly complex systems. Teams can use equivalent yet synthetic or de-identified data sets for the purpose of testing the same scenario that was prioritized based on real production examples without requiring exposure to protected health information (PHI), sensitive personal identifying information (SPII), or other sensitive and regulated data.

The present disclosure provides an improved method and system for creating test scenarios for testing transaction processing systems, which may reduce cost, accelerate test cycle time, and improve business process test coverage that may result in improved statistically meaningful test results. The disclosed embodiments thus provide significantly more than abstract ideas (e.g., mathematical concepts, certain methods of organizing human activity, and mental processes), laws of nature, or natural or physical phenomena, since the proposed embodiments involve methods and techniques that are more than what is well-understood, routine, or conventional activity in the field of software testing. Further, any abstract ideas, laws of nature, or natural/physical phenomena present in this disclosure, if at all, are simply applied, relied on, or used by the proposed embodiments as an integration into a practical application of testing a software system, such as a transaction processing system.

In accordance with aspects of the disclosure, systems and methods are disclosed for generating a test for a transaction processing system, and in particular, generating a test for a transaction processing system where the transaction processing system receives data indicative of transactions and processes this data by applying stored rules to the received data and generating a result thereof based on the applied rules. The disclosed embodiments generally create a set of test scenarios based on a specified subset of historical data such as previously processed transactions, as described herein, which may then be subsequently used to test the transaction processing system. The disclosed embodiments are preferably implemented with computer devices and computer networks, such as those described with respect to FIGS. 1A, 1B, and 4, that allow users, e.g. business employees, customers and parties related thereto, to create test scenarios used to test the transaction processing system.

While the disclosed embodiments will be discussed with respect to creating test scenarios and testing a health insurance claims processing system, e.g. a transaction processing system in which data items are received by the system and processed by the system by applying stored rules to the received data in order to generate results based thereon, it will be appreciated that the disclosed embodiments are applicable to creating test scenarios and testing any data processing or information system that receives and/or processes data in order to produce a set of outputs for a given set of inputs, including all types of insurance claims processing systems, point of sale systems, payment processing systems, accounting/billing systems, record keeping systems such as banking transaction systems, electronic reservations systems, electronic trading systems, data collection systems, etc.

An exemplary network environment 101 for generating a test for an exemplary transaction processing system 100 is shown in FIG. 1A. A transaction processing system 100, such as a health insurance claims computer system 100, receives, processes, and transmits health insurance claims between users, such as via wide area network 126 and/or local area network 124 and computer devices 114, 116, 118, 120 and 122, as will be described below, coupled with the insurance claims computer system 100. The exemplary network environment 101 shown in FIG. 1A also includes a testing system 140 that operates to test the operation and performance of a network-connected transaction processing system 100, such as the insurance claims computer system 100, that has been modified and/or updated. In particular, the testing system 140 may test the operation and performance of the modules contained in the modified/updated insurance claims computer system 100 through the processing of insurance claims previously processed by the insurance claims computer system 100 prior to the modification/upgrade. The testing system 140 may perform tests in order to ensure proper functionality of, and to detect any errors or defects in, the modified/updated version of the insurance claims computer system 100. Further, the insurance claims computer system 100 may be operable to facilitate messaging or other communication between the testing system 140 and/or the computer devices 114, 116, 118, 120 and 122 via wide area network 126 and/or local area network 124, particularly as it relates to information relating to the testing by the testing system 140.

In the exemplary embodiment shown in FIG. 1A, the testing system 140 is separate and distinct from the insurance claims computer system 100. In another embodiment, the testing system 140 may be incorporated as an individual module within the insurance claims computer system 100. As shown in FIG. 1A, the transaction processing system 100 is a health insurance claims computer system 100. However, the transaction processing system 100 may be any data processing or information system that receives and/or processes data, as discussed above.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The insurance claims computer system 100 may be implemented as a separate component or as one or more logic components, such as on an FPGA that may include a memory 105 or reconfigurable component to store logic and a processing component to execute the stored logic, or as computer program logic, stored in the memory 105, or other non-transitory computer readable medium, and executable by a processor 103, such as the processor 402 and memory 404 described below with respect to FIG. 4. In one embodiment, the system 100 is implemented by a server computer, e.g. a web server, coupled with one or more client devices 114, 116, 118, 120, 122, such as computers, mobile devices, etc. via a wired and/or wireless electronic communications network, such as the wide area network 126, local area network 124, and/or radio 132, in a network environment 101. In one embodiment, client devices 114, 116, 118, 120, 122 interact with the system 100 of the server computer to provide inputs thereto and receive outputs therefrom as described herein. The insurance claims computer system 100 may also be implemented with one or more mainframe, desktop or other computers, such as the computer 400 described below with respect to FIG. 4.

A claims database 102 or data structure may be provided which includes information identifying previously processed/adjudicated health insurance claims, or transactions, such as names, addresses, types of insurance, codes indicating health conditions, codes indicating procedures provided by a health care provider, types of benefits covered, costs of procedures provided by a health care provider, dates of service (i.e., when the procedures were performed by the health care provider), account numbers or identifiers, user names, passwords, a preferred contact method, contact information for the preferred contact method, etc. It will be appreciated that the claims database 102 may be stored in a memory 105 or other non-transitory medium coupled with the insurance claims computer system 100 and may be implemented by a plurality of databases, each of which stores a portion of the information.

Figure 4:
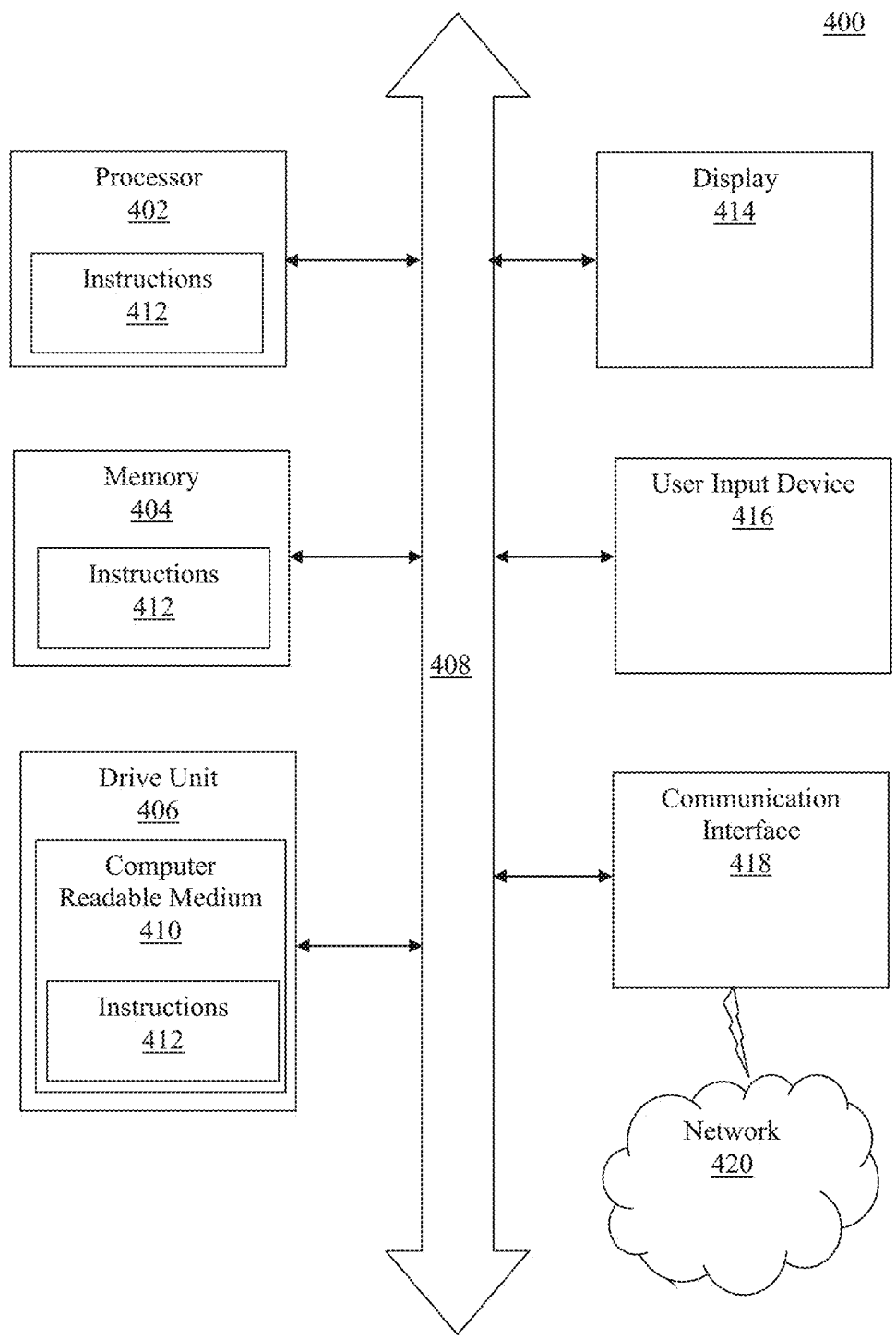
FIG. 4 shows an illustrative embodiment of a specialized computer system configured for generating a test and testing a transaction processing system.

An input module 104 may be provided and may be implemented as a separate component or as one or more logic components, e.g. first logic, such as on an FPGA that may include a memory 105 or reconfigurable component to store logic and a processing component to execute the stored logic, or as computer program logic, stored in the memory 105, or other non-transitory computer readable medium, and executable by a processor 103, such as the processor 402 and memory 404 described below with respect to FIG. 4, to cause the processor 103 to, or otherwise be operative to, receive data indicative of health insurance claims to be processed by the insurance claims computer system 100, such as from doctors' offices, hospitals, pharmacies, etc.

A claims processing module 106 may be included to process the health insurance claims and may be implemented as a separate component or as one or more logic components, e.g. first logic, such as on an FPGA that may include a memory 105 or reconfigurable component to store logic and a processing component to execute the stored logic, or as computer program logic, stored in the memory 105, or other non-transitory computer readable medium, and executable by a processor 103, such as the processor 402 and memory 404 described below with respect to FIG. 4, to cause the processor 103 to, or otherwise be operative to, process the health insurance claims by applying a set of rules, which are often complex and may include calculations, computations and/or derivations, to the received data. The claims processing module 106 may generate a result based on the processing of a given health insurance claim, such as whether a patient and/or a service, provided by a health care provider, is covered by a health care insurance company and/or the amount owed by the health care insurance company (e.g. covered amount) and/or patient (e.g. co-pay) to cover the cost of the procedure.

An output module 108 may be implemented as a separate component or as one or more logic components, e.g. first logic, such as on an FPGA that may include a memory 105 or reconfigurable component to store logic and a processing component to execute the stored logic, or as computer program logic, stored in the memory 105, or other non-transitory computer readable medium, and executable by a processor 103, such as the processor 402 and memory 404 described below with respect to FIG. 4, to cause the processor 103 to, or otherwise be operative to, communicate the result generated by the claims processing module 106. The processed health insurance claims may then be stored in the claims database 102 as data records or transactions, such as the transactions 302 described below with respect to FIG. 3C. It will be appreciated that any concurrent processing limits may be defined by or imposed separately or in combination, on one or more of the insurance claims computer system 100 components, including the claims database 102, the input module 104, the claims processing module 106, output module 108, or other component of the insurance claims computer system 100. As indicated herein, the testing system 140 may provide data elements, e.g. original or synthetic claims as will be described, to the insurance claims computer system 100 such that any and/or all of the modules are engaged and function to process the data elements, as is indicated for the processing of the insurance claims by the insurance claims computer system 100.

In an embodiment, the testing system 140 may be configured to receive a request to generate a test for the insurance claims computer system 100 that has been modified, or upgraded, from an initial or current state to a modified state (i.e., changed or upgraded state). In one example, the change in state may be due to an augmentation, enhancement or transformation of an existing system of the insurance claims computer system 100. In another example, the change in state of the insurance claims computer system 100 may be caused by a replacement of an existing system of the insurance claims computer system 100. In response to the request, the testing system 140 may, e.g. automatically, access historical data of the insurance claims computer system 100. The historical data may be stored in the claims database 102 and, as described above, may include a plurality of transactions, such as transactions 302 described below with respect to FIG. 3C, previously processed by the insurance claims computer system 100 in a then current state (i.e., its initial or prior state before being modified/upgraded). Each transaction of the plurality of previously processed transactions may include a plurality of data elements, such as data elements 304 described below with respect to FIGS. 3A-3C, previously processed by the insurance claims computer system 100 in its current or initial state. The plurality of previously processed transactions may also include corresponding values thereof, such as values 305 described below with respect to FIGS. 3A-3C, that define each corresponding transaction. The data elements may represent business dimensions and the corresponding values may represent specific attributes, the combination of which may simplify the universe of business patterns. Exemplary data elements (i.e., business dimensions), such as data elements 304 described below with respect to FIG. 3A, may include data indicative of health care claims, such as dates of service, group number, location, product type, provider information (e.g., service location and network status), and member information (e.g., relationship type, age, gender). Exemplary values (i.e., attributes) of the corresponding data elements, such as values 305 described below with respect to FIG. 3A, may include State of Illinois, PPO, HMO, in-network, out-of-network, subscriber, spouse, dependent, 41 years old, male, and female. The testing system 140 may also be configured to specify, based on the received request, a subset of the plurality of previously processed data elements to be tested. The testing system 140 may also be configured to select or determine one or more values for the data elements of the specified subset and identify one or more subsets of the plurality of previously processed transactions to test based on the specified subset and the selected or determined one or more values thereof. The testing system 140 may also be configured to extract the identified one or more subsets of the plurality of previously processed transactions as a test subset and store the extracted test subset in a memory, such as memory 160 described below with respect to FIG. 1B. The testing system 140 may also be configured to test the insurance claims computer system 100 in its modified state by having the insurance claims computer system 100 process a subset of historical data in its modified state and then compare those results to the results in the historical data (i.e., the results of being processed by the insurance claims computer system 100 in its initial pre-modified state).

The test generating network environment 101 shown in FIG. 1A includes exemplary computer devices 114, 116, 118, 120, 122, which depict different exemplary methods or media by which a computer device may be coupled with the insurance claims computer system 100 or by which a user may process or communicate, e.g. send and receive, health insurance claims or other information therewith. It will be appreciated that the types of computer devices deployed by users and the methods and media by which they communicate with the insurance claims computer system 100 is implementation dependent and may vary and that not all of the depicted computer devices and/or means/media of communication may be used and that other computer devices and/or means/media of communications, now available or later developed may be used. Each computer device, which may comprise a computer 400 described in more detail below with respect to FIG. 4, may include a central processor that controls the overall operation of the computer and a system bus that connects the central processor to one or more conventional components, such as a network card or modem. Each computer device may also include a variety of interface units and drives for reading and writing data or files and communicating with other computer devices and with the insurance claims computer system 100. Depending on the type of computer device, a user can interact with the computer with a keyboard, pointing device, microphone, pen device or other input device now available or later developed.

An exemplary computer device 114 is shown directly connected to the insurance claims computer system 100 in FIG. 1A, such as via a T1 line, a common local area network (LAN) or other wired and/or wireless medium for connecting computer devices, such as the network 420 shown in FIG. 4 and described below with respect thereto. The exemplary computer device 114 is further shown connected to a radio 132. The user of radio 132, which may include a cellular telephone, smart phone, or other wireless proprietary and/or non-proprietary device, may be a health care provider or health care insurance company employee. The radio user may transmit health care insurance claim information or other information to the exemplary computer device 114 or a user thereof. The user of the exemplary computer device 114, or the exemplary computer device 114 alone and/or autonomously, may then transmit the health care insurance claim information or other information to the insurance claims computer system 100.

As shown in FIG. 1A, exemplary computer devices 116 and 118 are coupled with a local area network ("LAN") 124 which may be configured in one or more of the well-known LAN topologies, e.g. star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1A, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with insurance claims computer system 100 via a conventional wireless hub 128.

FIG. 1A also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 420 shown in FIG. 4 and described below with respect thereto. One skilled in the art will appreciate that numerous additional computers and systems may be coupled to the insurance claims computer system 100.

The operations of computer devices and systems shown in FIG. 1A may be controlled by computer-executable instructions stored on a non-transitory computer-readable medium. For example, the exemplary computer device 116 may include computer-executable instructions for receiving health care insurance claim information from a user and transmitting that information to the insurance claims computer system 100. In another example, the exemplary computer device 118 may include computer-executable instructions for providing electronic messages to the insurance claims computer system 100 and/or receiving health care insurance claim data or other messages from the insurance claims computer system 100 and displaying that information to a user.

Of course, numerous additional servers, computers, handheld devices, personal digital assistants, telephones and other devices may also be connected to the insurance claims computer system 100. Moreover, one skilled in the art will appreciate that the topology shown in FIG. 1A is merely an example and that the components shown in FIG. 1A may include other components not shown and be connected by numerous alternative topologies.

Figure 1B:
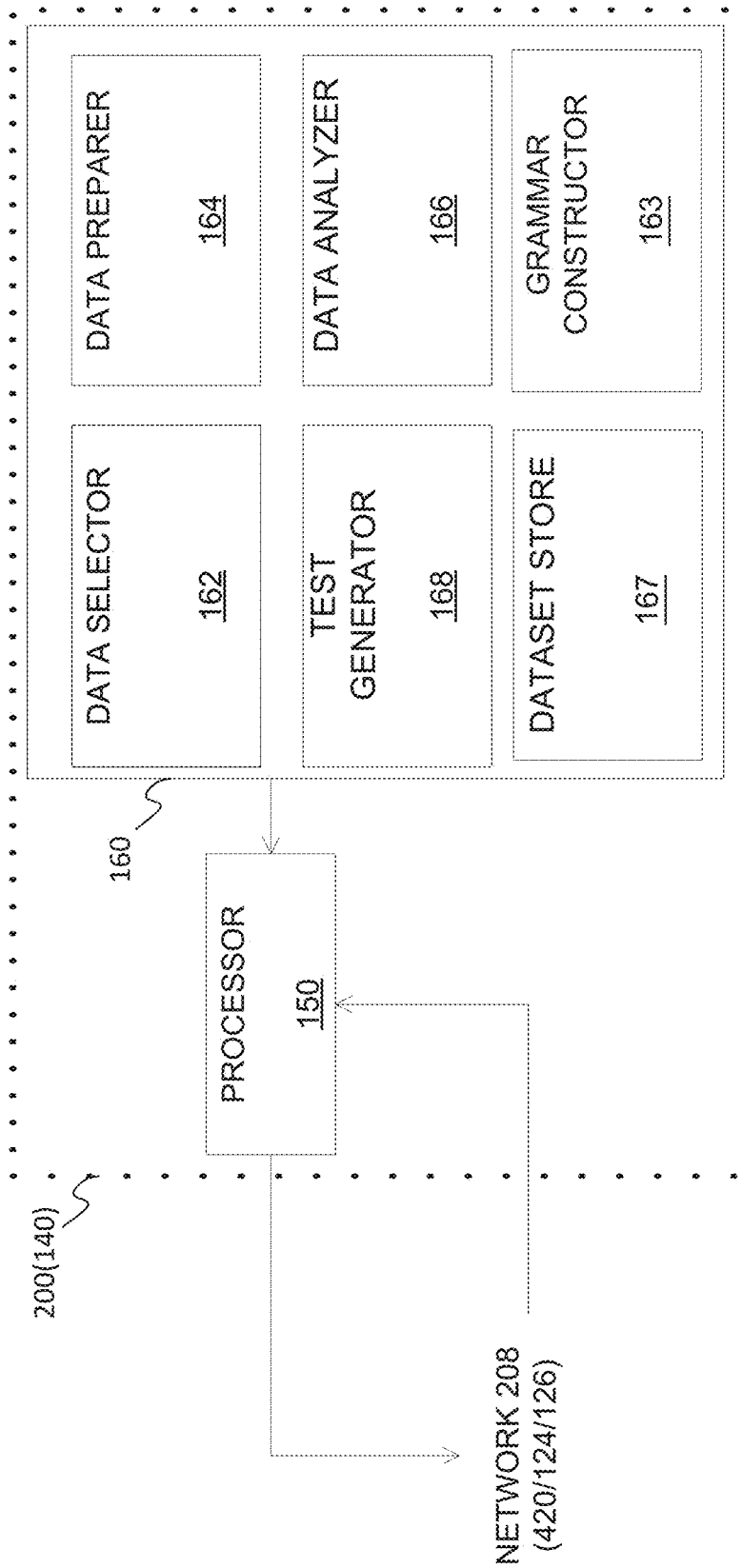

FIG. 1B depicts a block diagram of a testing system 140 according to one embodiment, which in an exemplary implementation, is implemented as part of the insurance claims computer system 100 described above.

FIG. 1B shows a system 200 for testing a transaction processing system 100, such as the insurance claims computer system 100 shown in FIG. 1A. However, as stated above, the transaction processing system 100 may be any data processing or information system that receives and/or processes data. The system 200 may communicate with the transaction processing system 100 via a network 208, which may be the network 420 described below or network 124 or 126 described above. The system 200 may be separate and distinct from the transaction processing system 100, as described above. In another embodiment, the system 200 may be incorporated as an individual module within the transaction processing system 100. The system 200 may involve functionality to access, identify, select, accumulate, organize and/or otherwise manipulate electronic messages containing data elements (e.g., data indicative of health care claims) that have previously been received and/or processed by the transaction processing system 100, such as the insurance claims computer system 100. The system 200 may involve functionality to supply, inject, receive, and/or otherwise communicate the electronic messages to the transaction processing system 100 in a manner that mimics or mirrors the provision of electronic messages from users using any of the previously described workstations and/or interfaces 116, 118, 122, 120, 114. As such, the transaction processing system 100 may accept and/or otherwise receive the synthesized electronic messages from the system 200, and process them similar to how the transaction processing system 100 processes other electronic messages received from other sources. This will mimic the actual operation of the transaction processing system 100, but with controlled and/or specified data. It will be appreciated that the disclosed embodiments may be applicable to other types of electronic messages, data elements, and transaction processing systems, beyond those described specifically with respect to the insurance claims computer system 100 or other data processing or information systems. Further, the datasets, and/or the data elements contained therein, may be communicated throughout the system using one or more data packets, datagrams or other collection of data formatted, arranged configured and/or packaged in a particular one or more protocols, e.g. FTP, UDP, TCP/IP, Ethernet, etc., suitable for transmission via a network 214 as was described, such as the dataset communication format and/or protocols.

The system 200 includes a processor 150 and a non-transitory memory 160 coupled therewith which may be implemented as processor 402 and memory 404 as described below with respect to FIG. 4. The system 200 may be a testing system 140, as described above with respect to FIG. 1A. The system 200 further may include a dataset store 167, or database, configured to store one or more datasets involving a collection of data elements received and/or processed by a transaction processing system 100. The data elements may be organized in an ordered or standardized manner, such as including data indicating the type and corresponding values of data elements that were received by the transaction processing system 100. As shown, the system 200 includes various logical functions, individual devices, and/or combined devices. The logical functions, individual devices, and/or combined devices may share the processor 150 as shown, or may include individual processors, as well as any combination or shared processing abilities over multiple processors. As such, multiple processors 150 may be used in dedicated applications for the particular individual devices, and/or combined devices, or in any shared combination.

The system 200 may include a data preparer 164 that is stored in the memory 160 and executable by the processor 150 to access data indicative of a plurality of previously processed transactions, such as previously processed/adjudicated health insurance claims, from the transaction processing system 100. The processor 150 may include circuitry or a module or an application specific controller as a means for accessing data indicative of a plurality of previously processed transactions from the transaction processing system 100, e.g. previously processed claims stored in the claims database 102. Each transaction, or data record, of the plurality of previously processed transactions may include a plurality of data elements (e.g., data representing business dimensions, such as "State," "Line of Business," and "Product Type") previously processed by the transaction processing system 100 in a current state, including corresponding values thereof that define each corresponding transaction (e.g., "IL," "Group," and "PPO").

The system 200 may include a test generator 168 that may be implemented as a separate component or as one or more logic components, e.g. first logic, such as on an FPGA that may include a memory 160 or reconfigurable component to store logic and a processing component to execute the stored logic, or as computer program logic, stored in the memory 160, or other non-transitory computer readable medium, and executable by the processor 150, such as the processor 402 and memory 404 described below with respect to FIG. 4, to cause the processor 150 to, or otherwise be operative to, receive a request to generate a test for the transaction processing system 100 that has been modified from the current state, such as a current operating version, to a modified state, such as a version of the transaction processing system 100 after an upgrade. The processor 150 may include circuitry or a module or an application specific controller as a means for receiving a request to generate a test for the transaction processing system 100 in a modified state. The test generator 168 may also be executable by the processor 150 to specify, based on the request, a subset of the plurality of previously processed data elements to be tested. The processor 150 may include circuitry or a module or an application specific controller as a means for specifying the subset of the plurality of previously processed data elements to be tested. The test generator 168 may also be executable by the processor 150 to automatically identify previously processed data elements based on a type of data element, a data element value, a type of transaction, a frequency of occurrence of a transaction or data element in the plurality of previously processed transactions, or combinations thereof. The foregoing list is not exhaustive, and the test generator 168 may also identify previously processed data elements or transactions based on other characteristics of the data elements or transactions.

In one embodiment, in order to test the transaction processing system 100, the test generator 168 may be executable by the processor 150 to cause the transaction processing system 100 in the modified state to process each transaction of one or more identified subsets of the plurality of previously processed transactions. As will be discussed below, the one or more identified subsets of the plurality of previously processed transactions may be referred to as test scenarios. In another embodiment, the identified test scenarios may be analyzed to determine a prioritized set of previously processed transactions to test, as discussed below with reference to FIG. 5. In this embodiment, the test generator 168 may be executable by the processor 150 to cause the transaction processing system 100 in the modified state to process each synthesized transaction of the prioritized set of test scenarios (i.e., previously processed transactions).

The test generator 168 may then generate a corresponding test result based on the transaction processing system 100 processing the transactions of the one or more identified subsets of the plurality of previously processed transactions or the prioritized set of test scenarios. The test generator 168 may also be executable by the processor 150 to compare the generated test result to the corresponding result of the corresponding transaction previously processed by the transaction processing system 100 in the then-current state (i.e., prior to being modified). In one embodiment, based on the comparison, the test generator 168 may be executable by the processor 150 to determine a fault when the generated test result deviates from the corresponding result of the corresponding transaction previously processed by the transaction processing system 100 prior to being modified. The test generator 168 may determine a fault when the generated test result deviates from the corresponding result by a threshold amount. In another embodiment, the test generator 168 may not determine a fault when the generated test result does not deviate from the corresponding result of the corresponding transaction previously processed by the transaction processing system 100 prior to being modified. In another embodiment, the test generator 168 may also be executable by the processor 150 to compare the generated test result to an expected result, where the expected result is a result expected to occur based on the transaction processing system 100 being modified. In other words, the expected result may be a result that occurs when it is expected that the modified transaction processing system 100 would result in a changed outcome. Thus, the expected result may be a predetermined result. In this case, the test generator 168 may be executable by the processor 150 to determine a fault when the generated test result deviates from the expected result.

In one embodiment, when the test generator 168 determines a fault, the test generator 168 may be executable by the processor 150 to generate a message indicating that the test was unsuccessful. In another embodiment, when the test generator 168 does not determine a fault, the test generator 168 may be executable by the processor 150 to generate a message indicating that the test was successful. The test generator 168 may also be executable by the processor 150 to communicate, via wide area network 126 and/or local area network 124, the messages indicating that the test was either successful or unsuccessful to users using any of the previously described workstations and/or interfaces 116, 118, 122, 120, 114.

The system 200 may include a data selector 162 that may be implemented as a separate component or as one or more logic components, e.g. first logic, such as on an FPGA that may include a memory 160 or reconfigurable component to store logic and a processing component to execute the stored logic, or as computer program logic, stored in the memory 160, or other non-transitory computer readable medium, and executable by the processor 150, such as the processor 402 and memory 404 described below with respect to FIG. 4, to cause the processor 150 to, or otherwise be operative to, select one or more values for the data elements of the specified subset of the plurality of previously processed data elements to be tested. The processor 150 may include circuitry or a module or an application specific controller as a means for selecting one or more values for the data elements of the specified subset of the plurality of previously processed data elements to be tested. The data selector 162 may also be executable by the processor 150 to identify one or more subsets of the plurality of previously processed transactions to test based on the specified subset of the plurality of previously processed data elements to be tested and the selected one or more values thereof. The processor 150 may include circuitry or a module or an application specific controller as a means for identifying one or more subsets of the plurality of previously processed transactions to test. The identified one or more subsets of the plurality of previously processed transactions, and their corresponding values, may be referred to test scenarios, as discussed above. Each of the test scenarios includes a set of data corresponding to an identified subset of the one or more identified subsets of the plurality of previously processed transactions and the corresponding values thereof. The data selector 162 may also be executable by the processor 150 to analyze the data elements of the specified subset of the plurality of previously processed data elements. The data selector 162 may then select, based on a predefined assessment algorithm, specific data element values, data element values above a predetermined upper threshold, data element values below a predetermined lower threshold, data element values within a predetermined range, an average data element value, data element values that occur most frequently in the specified subset of the plurality of previously processed data elements, data element values that occur least frequently in the specified subset of the plurality of previously processed data elements, or combinations thereof. The foregoing list is not exhaustive and the data selector 162 may select any data element value. The data selector 162 may also be executable by the processor 150 to select, based on a predefined assessment algorithm, a prioritized set of previously processed transactions or previously processed data elements to test.

The system 200 may include a data analyzer 166 that may be implemented as a separate component or as one or more logic components, e.g. first logic, such as on an FPGA that may include a memory 160 or reconfigurable component to store logic and a processing component to execute the stored logic, or as computer program logic, stored in the memory 160, or other non-transitory computer readable medium, and executable by the processor 150, such as the processor 402 and memory 404 described below with respect to FIG. 4, to cause the processor 150 to, or otherwise be operative to, analyze the results of testing the transaction processing system 100 to determine a degree to which the transaction processing system 100 in the modified state is tested. The degree to which the transaction processing system 100 is tested may be referred to as test coverage. The data analyzer 166 may also be executable by the processor 150 to compute, based on when a fault is determined, a statistical measure of risk of failure of the transaction processing system 100 in the modified state. In one embodiment, the data analyzer 166 may be executable by the processor 150 to analyze the identified one or more subsets of the plurality of previously processed transactions in the database to determine, based on a predefined assessment algorithm, a prioritized set of previously processed transactions or previously processed data elements to test. In another embodiment, the data selector 162 may perform this analysis prior to selecting the prioritized set of previously processed transactions or previously processed data elements to test. The prioritized set of previously processed transactions is discussed below with respect to FIG. 5.

The data analyzer 166 may also be executable by the processor 150 to automatically identify, based on items specified in the request to generate a test for the transaction processing system 100, previously processed data elements in the transaction processing system 100 to test. The items specified in the request may include a type of data element, a data element value, a type of transaction, a frequency of occurrence of a transaction or data element in the plurality of previously processed transactions, a type of result generated based on the stored rules being applied to the data received by the input of the transaction processing system 100 in the current state, a result value, or any other characteristic of either a data element or transaction. The data analyzer 166 may also be executable by the processor 150 to automatically identify previously processed data elements based on a relationship between the previously processed data elements and corresponding values thereof identified in the request.

That data analyzer 166 may utilize existing big data technologies (e.g., Hadoop, Apache Spark, Spark SQL, etc.) and established analytics concepts (e.g., algorithms such as a Frequency-Severity model) to perform its various functions. The data analyzer 166 may also utilize existing data storage, programming, and visualization tools, such as Tableau, Parquet, Java, Scala, etc. However, other data technologies, concepts, and tools, now available or later developed, may also be used.

In one embodiment, the request may be in the form of a natural language request. In this embodiment, the system 200 may include a grammar constructor 163 that may be implemented as a separate component or as one or more logic components, e.g. first logic, such as on an FPGA that may include a memory 160 or reconfigurable component to store logic and a processing component to execute the stored logic, or as computer program logic, stored in the memory 160, or other non-transitory computer readable medium, and executable by the processor 150, such as the processor 402 and memory 404 described below with respect to FIG. 4, to cause the processor 150 to, or otherwise be operative to, associate natural language terms, phrases, or concepts contained in the request with characteristics of previously processed data elements or previously processed transactions. Example characteristics include, but are not limited to, one or more types of data elements, one or more data element values, one or more types of transactions, a frequency of occurrence of a transaction or data element in the plurality of previously processed transactions, one or more types of results generated based on stored rules being applied to data received by the input of the transaction processing system 100 in the current state (i.e., prior to being modified), one or more result values, or combinations thereof. The foregoing list is not exhaustive, and the grammar constructor 163 may also associate other characteristics of the previously processed data elements or transactions with the natural language terms, phrases, or concepts contained in the request. In this regard, the natural language request represents the subset of the plurality of previously processed data elements to be tested.

In one embodiment, predefined grammar rules for associating natural language terms, phrases, or concepts with characteristics of previously processed data elements or transactions are provided to the grammar constructor 163. For example, predefined grammar rules may include a fixed vocabulary of business-relevant terms. In this embodiment, natural language processing techniques, or similar machine learning techniques, may be utilized to receive an input, such as text or speech, and map that input to predefined dimension-attribute pairs (i.e., physical field and value combinations). A user may provide the predefined grammar rules to the grammar constructor 163 of the testing system 140 via wide area network 126 and/or local area network 124 and computer devices 114, 116, 118, 120 and 122. In this embodiment, the grammar constructor 163 may apply those predefined grammar rules to the received request, identify a subset of characteristics of previously processed data elements or transactions based on the predefined grammar rules, and communicate the identified subset of characteristics to the test generator 168. The test generator 168 may then specify a subset of the plurality of previously processed data elements to be tested based on the subset of characteristics identified and communicated by the grammar constructor 163. The use of natural language processing or machine learning techniques may allow for the alignment across dimension-attribute pairs that may be redundant or similar in order to rationalize down to an essential set of dimension-attribute pairs. For example, the proliferation of "slang," as opposed to more formal definitions, contained in the input or request may be avoided. In another example, the natural language processing or machine learning techniques may also identify synonyms and/or antonyms that may be unnecessary or conflicting with one another.

Figure 2:
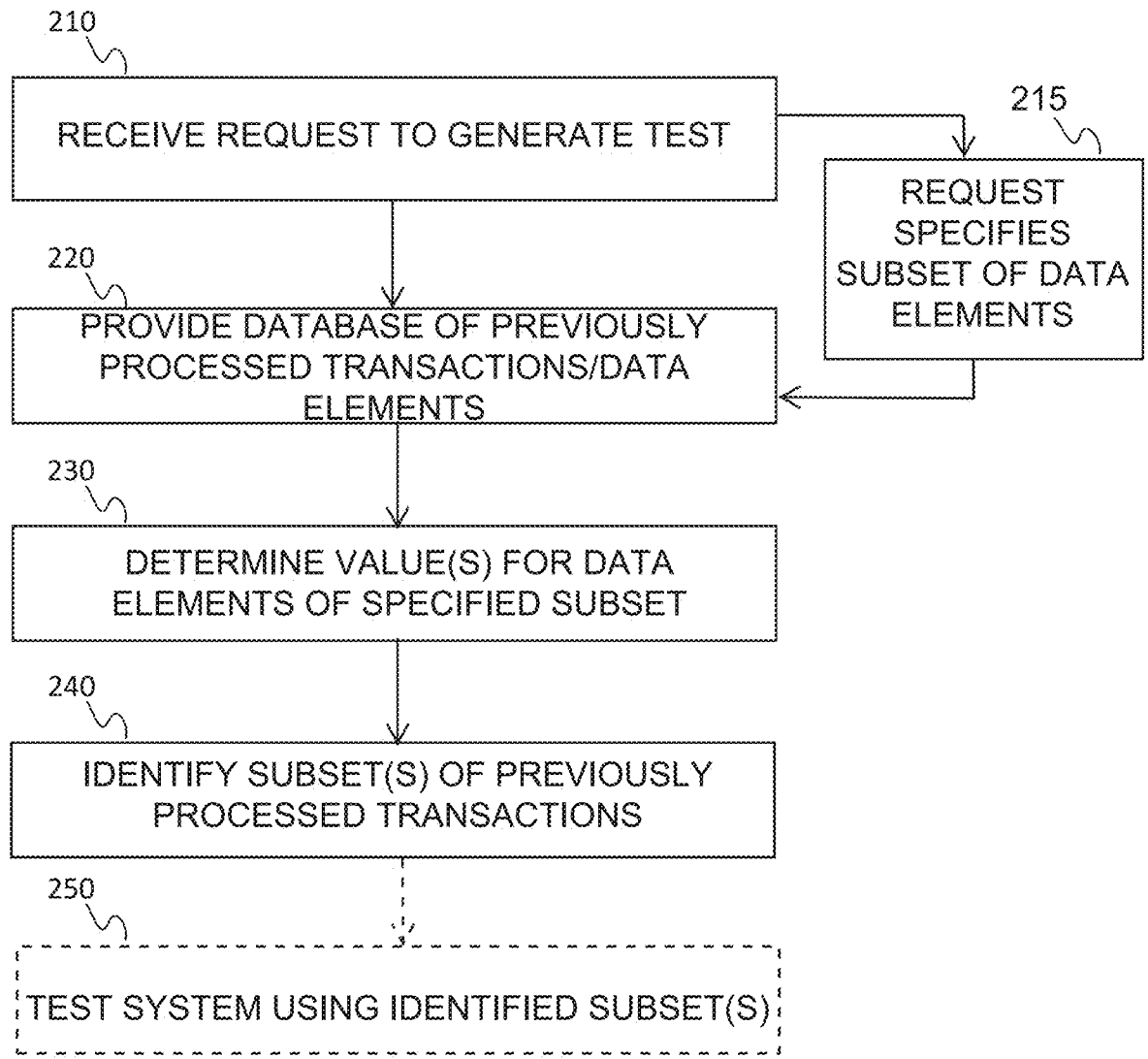
FIG. 2 depicts a flow chart illustrating an exemplary operation of the system of FIGS. 1A-1B.

FIG. 2 depicts a flow chart showing operation of the testing system 140 of FIGS. 1A and 1B. In particular, FIG. 2 shows a computer implemented method for testing a transaction processing system 100. The operation includes receiving a request to generate a test (Block 210), where the request specifies a subset of data elements (Block 215), providing a database of previously processed transactions and data elements (Block 220), determining values for data elements of the specified subset (Block 230), and identifying subsets of the previously processed transactions (Block 240). Additional, different, or fewer indicated acts may be provided. For example, testing the system using the identified subsets (Block 250) may be included. In another example, the operation of the testing system 140 may include extracting the identified one or more subsets of the plurality of previously processed transactions from the database as a test subset and storing the extracted test subset in a memory. The indicated acts may be performed in the order shown or other orders. The indicated acts, alone or in combination, may also be repeated, for example, determining values for data elements of the specified subset (Block 230), identifying subsets of the previously processed transactions (Block 240), and testing the system using the identified subsets (Block 250) may be repeated. The indicated acts may also be performed automatically, either individually or as a whole, by the testing system 140 as described above.

The request to generate a test for a transaction processing system 100 in a modified state may be received (Block 210) using any technique. For example, a user using any of the previously described workstations and/or interfaces 116, 118, 122, 120, 114 may submit a request via the workstations and/or interfaces 116, 118, 122, 120, 114 to the testing system 140 via wide area network 126 and/or local area network 124, the wireless hub 128, or the radio 132. In another embodiment, the request may be automatically provided to the testing system 140 from another system, including the transaction processing system 100, such as the insurance claims computer system 100 of FIG. 1A. In an embodiment, the request may be received by a processor 150 of a transaction processing testing system 140, such as the testing system 140 of FIGS. 1A and 1B. The test may be a software test that executes a program or application of the transaction processing system 100 that has been modified from a current state to a modified state with the intent of finding software bugs (errors or other defects), verifying that the transaction processing system 100 operates as designed/expected and verifying that the transaction processing system 100 is fit for use. The test may establish that the transaction processing system 100 does not function properly under specific conditions (e.g., test scenarios). Thus, the test may include one or more test scenarios. As mentioned above, a test scenario may be any functionality of a system under test that can be tested and may involve sequences of particular input combinations and expected results. Input combinations may include pairs of data (i.e., field-value pairs), such as a data element (representing business dimensions) and its corresponding value (representing attributes). These field-value pairs of business dimensions and attributes, or test scenarios, form mutually exclusive and collectively exhaustive descriptions of data that simplify the universe of business patterns. The test scenarios may be business-driven concepts defined specifically to evaluate test coverage. In this regard, test scenarios may act as a unit of measure and guideline that allows users to compare data sets from various sources that use similar but different ways to describe the same thing (such as requirements, test cases, relational databases, flat files, etc.). In one embodiment, a test scenario may include a set of data corresponding to an identified subset of previously processed transactions, such as health care claims, and the corresponding values thereof.

The transaction processing system 100 may be an electronic health care insurance claims processing system and may include a processor having an input, an output and a memory coupled therewith. The input of the transaction processing system 100 may be operative to receive transactions. In an embodiment, the transactions may be health insurance claims. The transactions may include a plurality of data elements. Data elements may involve any data, including information related to transactions processed by the transaction processing system 100. The data elements may be received by the transaction processing system 100 as electronic messages containing the data. Exemplary data elements may include data indicative of health care claims, such as regions, lines of business, type of health care claim, amount of claim benefit paid by insurer or patient (i.e., reimbursement amount), dates of service, group number, product type, provider information (e.g., service location and network status), and member information (e.g., relationship type, age, gender). Values of the data elements may define the transaction, or data record. Exemplary values of the corresponding data elements may include northeast region of the State of Illinois, Group/Government/Retail line of service, specific medical billing codes, actual dollar amounts, specific dates (e.g., Apr. 12, 1978), specific group numbers, PPO, HMO, in-network, out-of-network, subscriber, spouse, dependent, 41 years old, male, and female. The memory of the transaction processing system 100 may be operative to store a plurality of rules. The rules may dictate how specific data is processed. For example, the stored rules may be rules of a health insurance company that dictate how health care claims are processed to determine which, if any, services are covered and, if so, the amount of reimbursement. The rules may also govern how reimbursement amounts are calculated. The processor of the transaction processing system 100 may be operative to apply the stored rules to received transactions and generate, based thereon, a result communicated via the output. The result may include a decision and specific amounts. For example, a result may indicate specific health care services that a health insurer will cover as well as specific reimbursement amounts.

The requested test may test the transaction processing system 100 in a modified state. As stated above, the modified state may be a state of the transaction processing system 100 that is changed from a current state. The current state may be an operating version of the transaction processing system 100 and the modified state may be a modified version of the transaction processing system 100 that is to be tested, such as when the transaction processing system 100 is upgraded.

The request may specify a subset of a plurality of previously processed data elements to be tested. The subset may include a smaller number of data elements than the set, or the entire plurality of previously processed data elements. Specifying the subset of the plurality of previously processed data elements to be tested may include automatically identifying previously processed data elements based on certain criteria. For example, the subset of the plurality of previously processed data elements may be automatically identified based on a type of data element, a data element value, a type of transaction, a frequency of occurrence of a transaction or data element in the plurality of previously processed transactions, a type of result generated by the transaction processing system 100 based on the stored rules being applied to the transactions received by the input of the transaction processing system 100 prior to being modified, a result value, or any combinations of such criteria that are specified in the request. Specifying the subset of the plurality of previously processed data elements to be tested may also include automatically identifying previously processed data elements based on a relationship between the previously processed data elements and corresponding values thereof identified in the request. In one example, the relationship between the previously processed data elements and corresponding values may be the frequency of which a particular data element and corresponding value occur in the set of previously processed data elements. In another example, the relationship may be when values of particular data elements are either above or below a predetermined threshold limit.

Automatically identifying previously processed data elements based on certain criteria, such as those discussed above, may be performed using any analytical framework designed to handle data sets with sizes beyond the ability of commonly used software tools to capture, curate, manage, and process data within a tolerable elapsed time. The framework may be a configurable analytics framework designed to leverage technologies specifically applicable to extremely large data sets (i.e., big data technologies) and applied business concepts to reduce cost, accelerate cycle time, and improve test coverage. Big data technologies may include techniques for analyzing data, such as A/B testing, machine learning, and natural language processing. Business intelligence, cloud computing, and visualization tools may also be utilized. Exemplary frameworks, such as the disclosed BDAT framework, may also include special infrastructure, including applications, computing resources, and data storage systems, such as specialized databases and file systems. Any technologies, now known or later developed, such as those discussed above with respect to the data analyzer 166, may be used to analyze the previously processed transactions and data elements of the exemplary transaction processing system 100. An example analysis and visualization of previously processed transactions and data elements is discussed below with respect to FIG. 5.

In one embodiment, as discussed above with respect to the grammar constructor 163 of the testing system 140, the request may be a natural language request. In this embodiment, the request may be a natural language query having terms, phrases, or concepts associated with characteristics of previously processed data elements or previously processed transactions. Example characteristics include, but are not limited to, one or more types of data elements, one or more data element values, one or more types of transactions, a frequency of occurrence of a transaction or data element in the plurality of previously processed transactions, one or more types of results generated based on the stored rules being applied to the transaction received by the input of the transaction processing system 100 prior to being modified (i.e., in the current state), one or more result values, or combinations thereof. As discussed above, the natural language request represents the subset of the plurality of previously processed data elements to be tested.

As discussed above, the natural language query is constructed using a common, system agnostic "grammar" that is used to describe, in business terms, a set of data that can be encountered by a software-based information-technology product. Requests to generate tests are thus not only understandable to a business customer, but are constructed using actual business language. Embodiments disclosed herein use operationally viable terms in the grammar that are not approximations or subjective generalizations of data—but are in fact mapped directly to actual technical data elements. This allows users to leverage data visualization techniques to represent data in a way to instantly have the narrative description of the visualization alongside it. The concepts and results of the disclosed framework, such as the BDAT framework, are operationally understood and relevant yet can be applied technically without conversion. The concepts contained in the grammar can be written into requirements or test cases directly. This integration allows for 1) a "pre-testing" coverage check for a particular project (i.e. are the relevant, mutually exclusive, and collectively exhaustive combinations being addressed in this project?), 2) the ability to connect to more detailed, testable data in an automated fashion, and 3) a built-in categorization model to evaluate the volume, span, and reusability of all delivery artifacts. In one embodiment, a smart "data keyword" capability may be available to identify and load/select data at test runtime. Test scenarios, or field-value pairs as described above, may be used as logical data keywords within and across business products. Since the common business definitions of test scenarios can be leveraged across system-specific physical data, the test scenarios may be used as application-spanning (i.e., "cross product") data keywords.

The business orientated grammar used to identify scenarios to test allows for reproducibility and explainability. It may be difficult to reproduce results or make them meaningful to a wider audience when a path to a solution is not easily explainable, especially by someone who is not a business subject matter expert, or where the path is hidden for proprietary reasons. Conventional approaches may be a "black box," where the inner machinations are hidden to all but the machine or its programmer. The "how" or "why" the black box arrived at its conclusions are not exactly known or easily explained. Rather, a user may only tell what went into the black box and what result came out of it. The embodiments disclosed herein are different and involve an improved approach to arriving at the solution. The disclosed approach is transparent, and methods used, such as prioritization algorithms, are clear and based on common business sense as represented in the constructed grammar. Identifying test scenarios are thus performed with a "top down" view and an understanding of the business-driven concepts, which allows the results to be understood and validated by a human with relative ease. A challenge with conventional, "bottom-up" machine learning analytics methods is that while there may be a viable statistical significance to conclusions, it may be very difficult to explain what the patterns are or how they relate to real life situations or examples. Results from using the disclosed embodiments disclosed herein do not need to be interpreted or modified for a business user, since the results are already in his or her operational language and can be viewed in a "clickable" dashboard in which lower-level details are accessible. As mentioned above, this is a specific manner of requesting data and formulating testing scenarios based on a natural language grammar used in queries, which provides a specific improvement over prior systems resulting in an improved user interface for designing a suite of test scenarios for testing software systems.

The database of previously processed transactions and data elements may be provided (Block 220) in any form. In one example, the database of previously processed transactions, such as health insurance claims, and data elements (e.g., data indicative of health care claims) may be provided in whole or in part. For example, previously processed transactions and data elements may be provided for a single month. In another example, claim data for an entire year may be provided. As indicated above, the database may include data indicative of a plurality of previously processed transactions. Each transaction of the plurality of previously processed transactions may include a plurality of data elements previously processed by the transaction processing system 100 prior to being modified, including corresponding results thereof. The database of previously processed transactions and data elements may include any number of transactions and an even larger number of data elements corresponding to the transactions. For example, the database may include 130 million transactions and 1.3 billion data elements.

The one or more values of interest for the data elements of the specified subset of the plurality of previously processed data elements of the request may be determined (Block 230) using any technique. In one embodiment, the determination is based on predefined criteria. In another embodiment, determining the one or more values of interest includes analyzing the data elements of the specified subset of the plurality of previously processed data elements to determine specific data element values, data element values above a predetermined upper threshold, data element values below a predetermined lower threshold, data element values within a predetermined range, an average data element value, data element values that occur most frequently in the specified subset of the plurality of previously processed data elements, data element values that occur least frequently in the specified subset of the plurality of previously processed data elements, or combinations thereof. In an embodiment, the determination is based on a predefined assessment algorithm. In one example, the predefined assessment algorithm may include a Frequency-Severity model.

The one or more subsets of the plurality of previously processed transactions in the database to test may be identified (Block 240) using any technique. For example, the identification may be based on the specified subset of the plurality of previously processed data elements of the request and the determined one or more values of interest thereof. The identified subsets of the plurality of previously processed transactions and their corresponding values determined in the previous step (Block 230) may be the resulting test scenarios used to test the transaction processing system 100. As discussed above, test scenarios are the unique combinations of data elements and their values that describe a particular record of data, such as a health insurance claim, or transaction. The identified subsets of the plurality of previously processed transactions may be extracted from a database, such as the claims database 102, as a test scenario, or test subset. The extracted test subset may then be stored in a memory, such as memory 160.

Figure 3A:
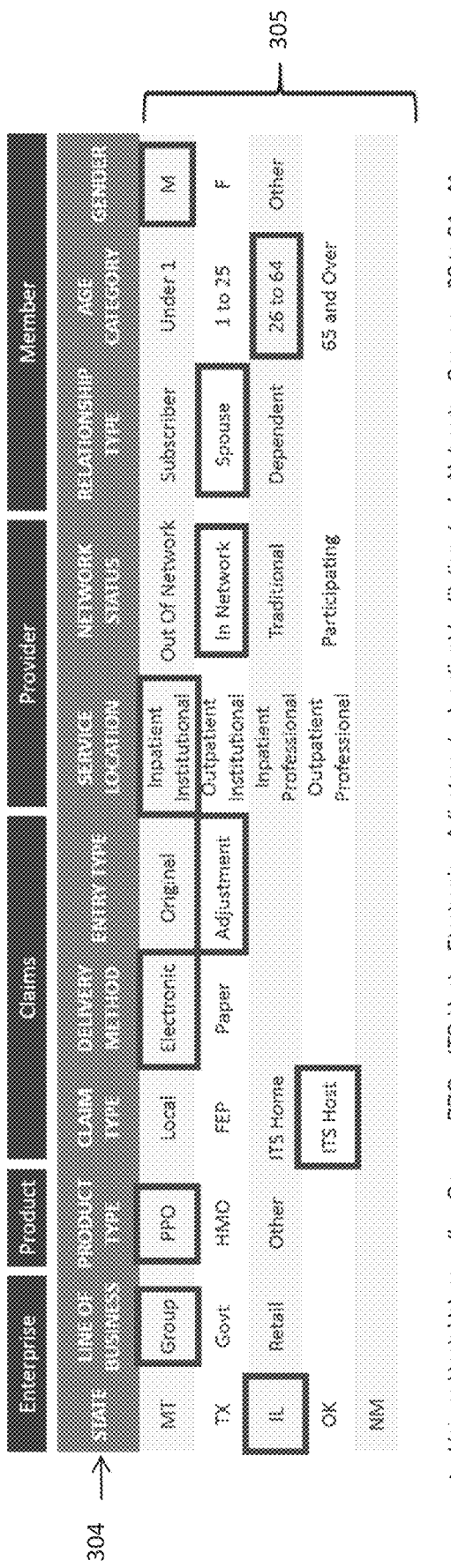
FIG. 3A illustrates an exemplary set of data elements and corresponding values.

FIG. 3A shows an example test scenario, or test subset, that may contain the following pairs of data elements 304 and values 305 for various business dimensions, or groups of data elements 304: for Enterprise business dimension, "State" data element 304 has a value 305 of "IL" and "Line of Business" data element 304 has a value 305 of "Group"; for Product business dimension, "Product Type" data element 304 has a value 305 of "PPO"; for Claims business dimension, "Claim Type" data element 304 has a value 305 of "ITS Host," "Delivery Method" data element 304 has a value 305 of "Electronic," and "Entry Type" data element 304 has a value 305 of "Adjustment"; for Provider business dimension, "Service Location" data element 304 has a value 305 of "Inpatient Institutional" and "Network Status" data element 304 has a value 305 of "In Network"; and for Member business dimension, "Relationship Type" data element 304 has a value 305 of "Spouse," "Age Category" data element 304 has a value 305 of "26 to 64," and "Gender" data element 304 has a value 305 of "M". In this example, this test scenario may be expressed as a unique hash value 307, or other unique data/identifier, that corresponds to "IL-Group-PPO-ITS Host-Electronic-Adjustment-Inpatient Institutional-In Network-Spouse-26 to 64-M."

Figure 3B:
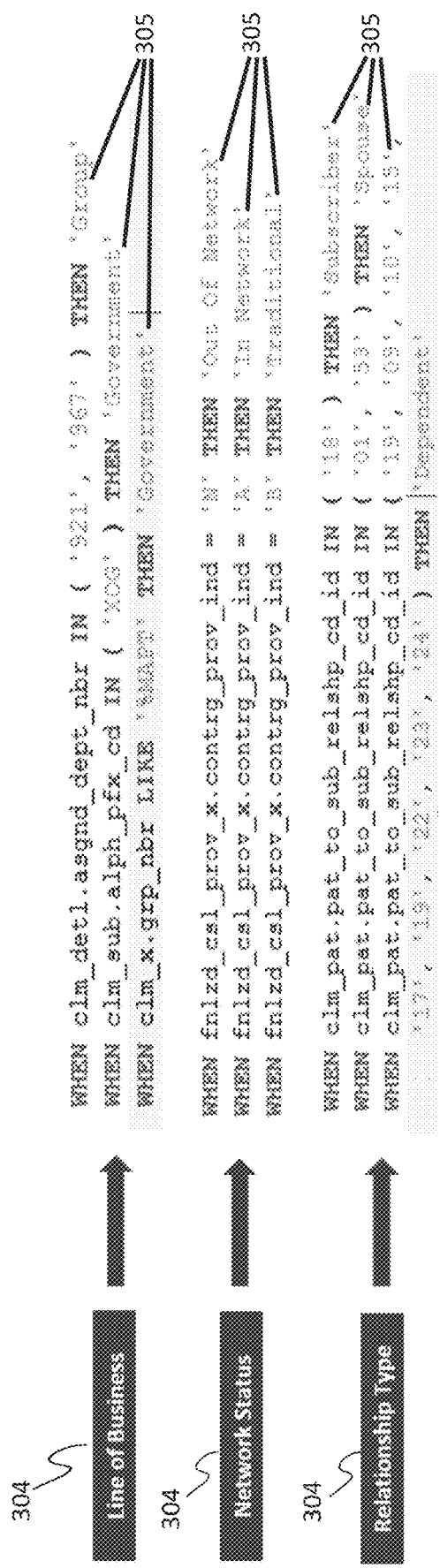
FIG. 3B depicts exemplary data mapping between data elements and their corresponding values.

FIG. 3B depicts exemplary data mapping between data elements 304 and their corresponding values 305. Logical, business-driven pairs of data elements 304 and values 305 (i.e., dimension-attribute pairs) must be mapped to physical, system-specific data combinations prior to extraction. In many cases, physical datastores and structures may have been built out in pieces and modified over time to meet new or changing requirements. This may result in the same logical data element 304, or dimension, requiring different fields, such as "Line of Business" in FIG. 3B, or different groupings of values 305, such as "Relationship Type" in FIG. 3B, to assign a value 305, or attribute. Mapping and extraction of production data based on data elements 304, such as various data slicing options pertaining to data indicative of health care claims, like date range, group number, location, etc., allows for determining the "source of truth" for test data and how it is defined at a physical-level.

Referring back to FIG. 2, once the one or more subsets of the plurality of previously processed transactions in the database to test are identified (Block 240), the transaction processing system 100 may be tested (Block 250). The transaction processing system 100 may be tested (Block 250) using the one or more identified subsets of the plurality of previously processed transactions. In one embodiment, the transaction processing system 100 may be tested prior to modification to determine whether the original results (i.e., the results obtained by the transaction processing system 100 processing the original transaction) are obtained once again. This may ensure that the transaction processing system 100 is processing transactions consistently. In another embodiment, the transaction processing system 100 is tested in the modified state. For example, once the transaction processing system 100 has been modified or upgraded, such as due to an enhancement, transformation, or replacement of an existing system of the transaction processing system 100, the transaction processing system 100 may be tested using the identified test scenarios. The testing may include causing the transaction processing system 100 in the modified state to process each transaction of the one or more identified subsets of the plurality of previously processed transactions and generate a corresponding test result based thereon. The testing may also include comparing the generated test result to the corresponding result of the corresponding transaction previously processed by the transaction processing system 100 in the current state (i.e., prior to being modified/upgraded). Then, the testing may include determining a fault when the generated test result deviates from the corresponding result of the corresponding transaction previously processed by the transaction processing system 100 in the current state. In an example, a fault may be determined when the generated test result deviates from the corresponding result by a threshold amount. For example, when the generated test result deviates from the corresponding result by 10 percent, a fault is determined. In another embodiment, the testing may include comparing the generated test result to an expected result, where the expected result is a result expected to occur based on the transaction processing system 100 being modified. In other words, the expected result may be a result that occurs when it is expected that the modified transaction processing system 100 would result in a changed outcome. Thus, the expected result may be a predetermined result. In this embodiment, a fault may be determined when the generated test result deviates from the expected result.

In an embodiment, a message may be generated indicating that the test was unsuccessful when a fault is determined and successful when a fault is not determined. The messages indicating that the test was either successful or unsuccessful may be communicated. For example, the message may be communicated, via wide area network 126 and/or local area network 124, to users using any of the previously described workstations and/or interfaces 116, 118, 122, 120, 114.

In an embodiment, testing the transaction processing system 100 may also include determining a degree to which the transaction processing system 100 in the modified state is tested. The degree to which the transaction processing system 100 is tested may be referred to as test coverage. Exemplary embodiments of the testing framework, or BDAT framework, disclosed herein may plan and evaluate system test coverage based on value-driven patterns of operational impact. As indicated above, this approach may be additive to traditional Requirement, Process, Random Sample, or Code coverage methods for testing. In another embodiment, testing the transaction processing system 100 may also include computing, based on when a fault is determined, a statistical measure of risk of failure of the transaction processing system 100 in the modified state.

In an embodiment, the test scenarios may be analyzed to determine a prioritized set of previously processed transactions to test. The prioritized set of previously processed transactions to test may be determined based on a predefined assessment algorithm. In an example, the predefined assessment algorithm may be a Frequency-Severity model. The prioritized set of previously processed transactions may include various subsets. In one embodiment, a subset may contain less transactions than the set. In another embodiment, a subset may contain the same number of transactions as the set. In an embodiment, the prioritized set of previously processed transactions includes a first subset of previously processed transactions indicative of transactions of low volume associated with a result value above a predetermined threshold. The prioritized set of previously processed transactions may also include a second subset of previously processed transactions indicative of transactions of high volume associated with a result value above the predetermined threshold. The prioritized set of previously processed transactions may also include a third subset of previously processed transactions indicative of transactions of high volume associated with a result value below the predetermined threshold. The prioritized set of previously processed transactions may also include a fourth subset of previously processed transactions indicative of transactions of low volume associated with a result value below the predetermined threshold. In this embodiment, transaction volume may correspond to a number of unique instances of a transaction present in the plurality of previously processed transactions in the database. An example prioritized set of previously processed transactions is discussed below with respect to FIG. 5.

After selecting a pre-defined assessment algorithm, exemplary embodiments disclosed herein may automatically measure and prioritize testing scenarios to determine what is most important to cover. Using those results, testing may be aligned accordingly to optimally balance prioritized coverage with available time or resources. In other words, using the priority of the test scenario, a right-sized amount of software testing to be done in order to manage the risk of missing impactful defects or bugs against the cost of exhaustively testing all possible permutations may be determined. Instead of attempting the infeasible, or spending time on non-impactful or redundant testing, the focus is on that which is most relevant and important to business customers or operations using the exemplary testing system. This is discussed in more detail below with regard to FIG. 5. As discussed above, this determination is established in a consistent and transparent way using the constructed grammar and natural language query.

In an embodiment, the transaction processing system 100 may be tested using the prioritized set of previously processed transactions. For example, the testing may include causing the transaction processing system 100 in the modified state to process each transaction of the prioritized set of previously processed transactions and generate a corresponding test result based thereon. The testing may also include comparing the generated test result to the corresponding result of the corresponding transaction previously processed by the transaction processing system 100 in the current state and determining a fault when the generated test result deviates from the corresponding result of the corresponding transaction previously processed by the transaction processing system 100 in the current state.

Figure 3C:
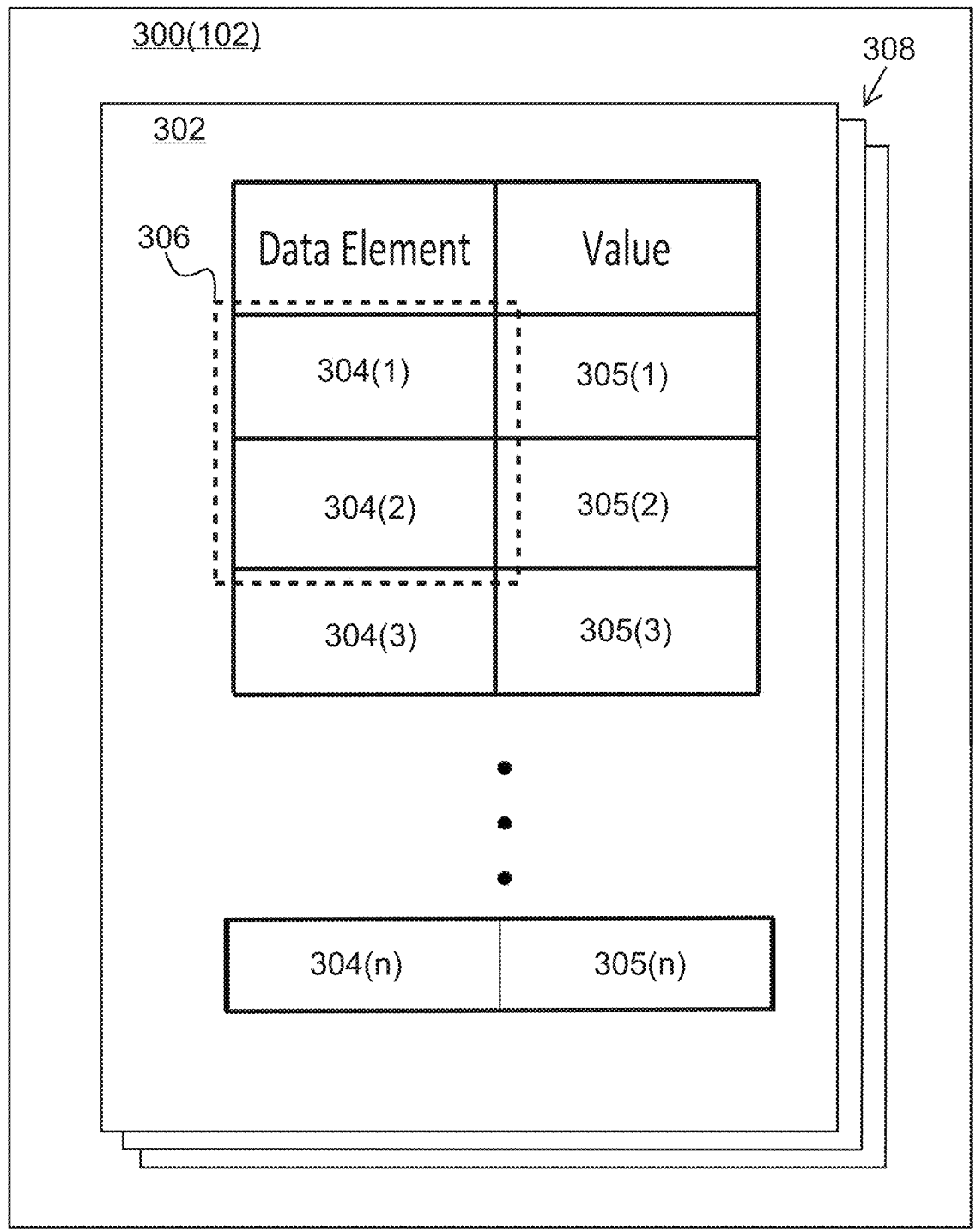
FIG. 3C illustrates an exemplary database containing a plurality of transactions and data elements.

FIG. 3C illustrates an exemplary database 300(102) containing a plurality of previously processed data records or transactions 302, such as health insurance claims, and data elements 304 (e.g., data indicative of health care claims). In this embodiment, the database 300 may be implemented as claims database 102 as described above with respect to FIG. 1A. Each transaction 302 may include a plurality of data elements 304 corresponding thereto, where the data elements 304 contain data indicative of the transaction 302. For example, transaction 302 includes data elements 304(1), 304(2), 304(3) . . . 304(n), where n represents the number of data elements 304 included within the particular transaction 302. Each data element 304 may have a corresponding value 305 associated thereto. As discussed above, the values 305 of the data elements 304 define the transactions 302. For example, for a health insurance claim involving a daughter of an insured individual under a Group health insurance plan in the State of IL, the transaction 302 involves at least a data element 304 for the State of the transaction, or claim, 302 having a value 305 of "IL," a data element 304 for the Line of Business of the claim having a value 305 of "Group," a data element 304 for the Relationship Type of the claimant having a value 305 of "Dependent," and a data element 304 for the Gender of the claimant having a value 305 of "F" or "Female." In FIG. 3C, for example, data elements 304(1)-304(n) were previously processed by the transaction processing system 100 prior to being modified (i.e., in a current state). To process data elements 304(1)-304(n), data indicative of the transaction 302 may be received by an input of the transaction processing system 100. A processor of the transaction processing system 100 may then apply rules stored on a memory of the transaction processing system 100 to the received transactions and generate, based on the stored rules, corresponding results. For the example above, a generated result may be that the claim is allowed, or the amount of coverage and reimbursement by the health insurer. In one example, transaction 302 may contain a data element 304 representing the received data, where the corresponding value 305 may represent data indicative of the received data. The transaction 302 may also contain a data element 304 representing the rules applied to the received data, where the corresponding value 305 may represent data indicative of the applied rules. The transaction 302 may also contain a data element 304 representing the results of the transaction processing system 100 applying the stored rules to the received data, where the corresponding value 305 may represent data indicative of the result.

For example, a data element 304 may represent data indicative of the result of whether a submitted health care claim is covered by an insurance carrier. In this example, the "coverage" data element 304 may have a corresponding value 305 of "yes" or "no." Similarly, the data record or transaction 302 may contain a "reimbursement" data element 304 having a corresponding value 305 of $1,500. As discussed above with respect to FIG. 3A, the transaction 302 may also contain data elements 304 representing business dimensions, such as State, Line of Business, Product Type, Claim Type, Delivery Method, Entry Type, Service Location, Network Status, Relationship Type, Age Category, and Gender. In this example, the transaction 302 may also contain corresponding values 305 representing specific attributes, such as Illinois, Group, PPO, ITS Host, Electronic, Adjustment, Inpatient Institutional, In Network, Spouse, 26 to 64, and M, respectively. The foregoing list is not exhaustive, and the transaction 302 may have other types and quantities of data elements 304 and values 305.

As indicated above, the request to generate a test for the transaction processing system 100 may specify a subset of the plurality of previously processed data elements 304 to be tested. This specified subset is shown in FIG. 3C as subset 306. In this example, subset 306 includes data elements 304(1) and 304(2). However, the subset 306 may include any combination of data elements 304 contained in the transaction 302. In another example, the specified subset 306 may contain data elements 304(1)-304(n) (i.e., all of the data elements 304 in the transaction 302). Specifying the subset 306 may include automatically identifying previously processed data elements 304 based on a relationship between the previously processed data elements 304 and corresponding values 305 thereof. Specific values 305 for the data elements 304 in the specified subset 306 may be determined. As discussed above, determining values 305 may include analyzing the data elements 304 of the specified subset 306 to determine characteristics of the data elements 304 in the specified subset 306. The analysis of the data elements 304 may be performed using a predefined assessment algorithm, such as a Frequency-Severity model, or any other big data technology or established analytics concept, as discussed above. One or more subsets 308 of the plurality of previously processed transactions 302 in the database 300 may be identified based on the specified subset 306 of the plurality of previously processed data elements 304 of the request and the determined one or more values 305 thereof. In the example shown in FIG. 3C, only one identified subset 308 is shown. However, transaction 302 may contain any number of subsets 308. The identified subsets 308 may become the test scenarios used to test the transaction processing system 100.

For example, to test the transaction processing system 100, each transaction 302 of the one or more identified subsets 308 of the plurality of previously processed transactions 302 that contain the specified subset 306 may be processed by the transaction processing system 100 in a modified state. The transaction processing system 100 may then generate a corresponding test result based thereon for each of the processed transactions 302. The testing may also include comparing the generated test results to the corresponding results of the corresponding transactions 302 previously processed by the transaction processing system 100 in the current state. Then, the testing may include determining a fault when a generated test result deviates from a corresponding result of the corresponding transaction 302 previously processed by the transaction processing system 100 in the current state. In another embodiment, the testing may include comparing the generated test result to an expected result, where the expected result is a result expected to occur based on the transaction processing system 100 being modified. In this case, the expected result may be a result that occurs when it is expected that the modified transaction processing system 100 would result in a changed outcome. The expected result may be a predetermined result. In this embodiment, a fault may be determined when the generated test result deviates from the expected result.

Referring to FIG. 4, an illustrative embodiment of a specialized computer system 400 is shown. The computer system 400 can include a set of instructions that can be executed to cause the computer system 400 to perform any one or more of the methods or computer-based functions disclosed herein. The computer system 400 may operate as a standalone device or may be connected, e.g., using a network, to other computer systems or peripheral devices. Any of the components discussed above, such as the processor 150, may be a computer system 400 or a component in the computer system 400. In an embodiment, the computer system 400 involves a custom combination of discrete circuit components. The computer system 400 may implement embodiments for testing a transaction processing system 100.

For example, the instructions 412 may be operable when executed by the processor 402 to cause the computer 400 to receive a request to generate a test for the transaction processing system 100 which has been modified from a current state to a modified state. The instructions 412 may also be operable to cause the processor 402 to provide a database including data indicative of a plurality of previously processed transactions, each transaction of the plurality of previously processed transactions having a plurality of data elements previously processed by the transaction processing system 100 prior to being modified, including corresponding results thereof. The instructions 412 may also be operable when executed by the processor 402 to cause the computer 400 to determine, based on predefined criteria, one or more values of interest for the data elements of the specified subset of the plurality of previously processed data elements of the request and identify one or more subsets of the plurality of previously processed transactions in the database to test.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

In an embodiment, single or multiple processors may be provided. Data elements 304 may be received from different client computers over a data communication network. The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400. In an embodiment, the input device 416 may facilitate a user in specifying a subset of data elements previously processed by the transaction processing system 100. For example, the display 414 may provide a listing of testing results, status and/or errors of a transaction processing system 100. Further the input device 416 may allow for the selection of one or more values for the data elements of the specified subset or previously processed data elements to be tested.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly. In an embodiment, the communication interface 418 may be configured to communicate datasets with user devices.

The network 420 may include wired networks, wireless networks, or combinations thereof. The wireless network may be a cellular telephone network, an 802.11, 802.16, 802.20, or WiMAX network. Further, the network 420 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" or "data processing system" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a reconfigurable logic device or an ASIC (application specific integrated circuit). As used herein, the terms "microprocessor" may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" will refer to data processing functionality that is deployed on a computer. The term "firmware" will refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together"—somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory. In an embodiment, processor 150 shown in FIG. 2 may be implemented using an FPGA or an ASIC. For example, the receiving, augmenting, communicating, and/or presenting may be implemented using the same FPGA.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 5:
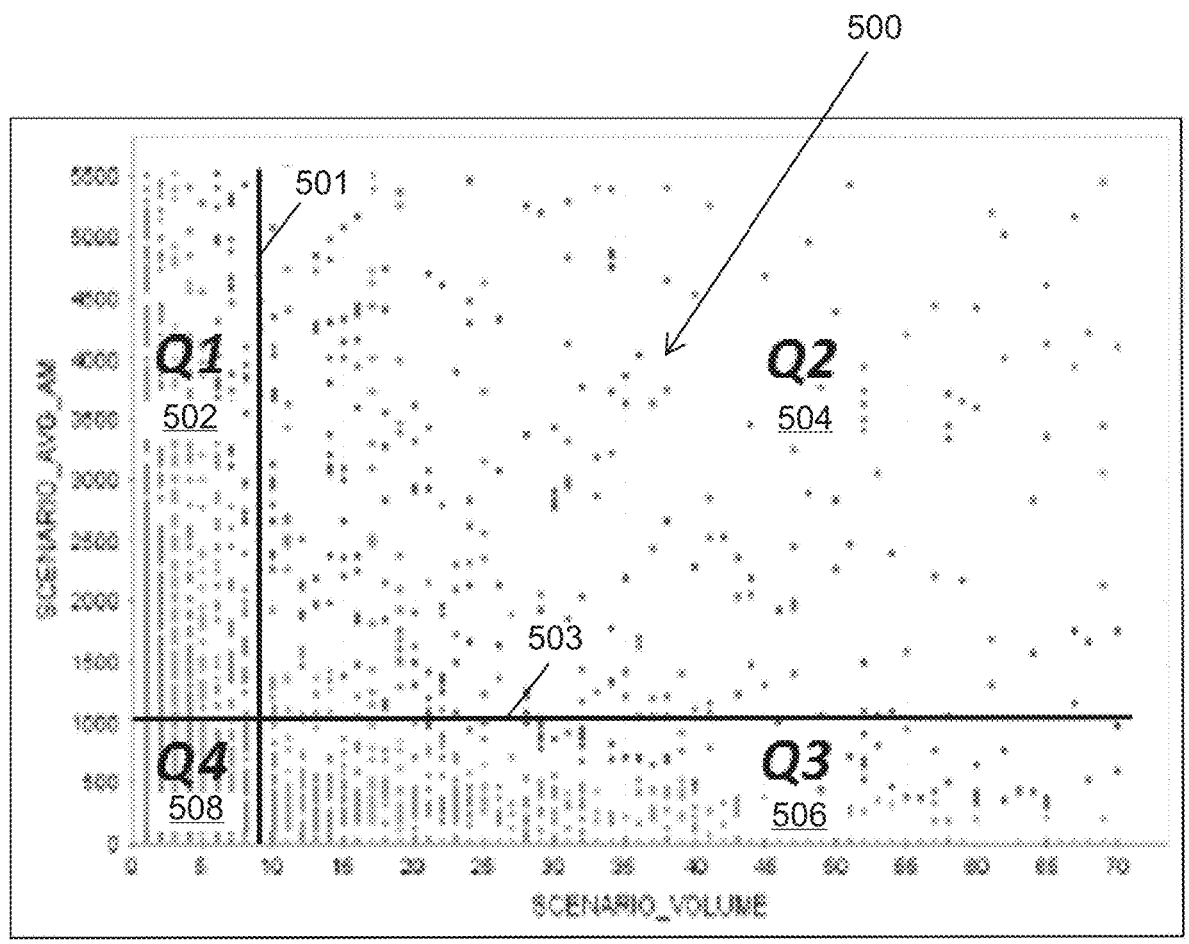
FIG. 5 illustrates an exemplary one or more subsets of previously processed data elements that were identified to be tested, including prioritized subsets within the identified subsets.

FIG. 5 illustrates an exemplary one or more subsets 500 of previously processed data elements 304 that were identified to be tested, including prioritized subsets within the identified subsets. FIG. 5 is a visualization of analysis performed on previously processed transactions and data elements in order to prioritize the identified test scenarios. The analytics utilized by the embodiments of the BDAT framework disclosed herein relies on top-down, business-driven definitions of impact and clustering approaches as opposed to bottom-up machine learning algorithms. For example, the disclosed BDAT framework first identifies criteria to evaluate test coverage and prioritized test scenarios and then determines the testing value of each test scenario based on any number of factors, such as, for example, dimension coverage, attribute pattern, frequency of business impact, severity of business impact, and optimized code coverage.

In an embodiment, the exemplary framework disclosed herein may apply dimensions (i.e., data elements) and attributes (i.e., values) to one month of finalized claims (i.e., previously processed transactions) to identify test scenarios to test. In one example, the one month of finalized claims contains roughly 20 million claims. The exemplary framework may then determine volume (frequency) and dollars at risk (severity) for each test scenario and group the test scenarios based thereon. Next, the exemplary framework may identify the $80^{th}$ percentile threshold value by omitting any outliers greater than 3 sigma (i.e., data within three standard deviations from a mean value is kept). This allows the disclosed framework to operate efficiently and produce items of the highest quality. The remaining test scenarios may then be divided into four quadrants (Q1, Q2, Q3, Q4) based on an average dollar amount and total claim volume thresholds, as will be discussed below. The test scenarios are prioritized based on the quadrant the test scenarios are within. For example, all test scenarios from quadrants Q1, Q2, and Q3 are selected for testing. In this example, quadrants Q1, Q2, and Q3 may cover all high value test scenarios. Test scenarios from quadrant Q4 may be selected if the Q4 test scenario ensures 100% attribute (i.e., value) coverage. The selected test scenarios from quadrants Q1-Q4 may then be assigned an identifier to identify the selected test scenarios to be used for testing (i.e., test bed creation).

Referring back to FIG. 5, based on the specified subset 306 of the plurality of previously processed data elements 304 contained in the received request and the determined one or more corresponding values 305 thereof, one or more subsets of transactions (i.e., test scenarios) 500 are identified for one month of claim data. In this embodiment, the average dollar amount (severity) is provided as the Y-axis and the claim volume by scenario (volume) is provided as the X-axis. Analytics, such as a predefined assessment algorithm, may be used to determine the $80^{th}$ percentile of average dollars at risk per claim (Y-intercept 503) and the $80^{th}$ percentile of total claim volumes (X-intercept 501). The Y-intercept 503 may be referred to as a severity threshold 503. The X-intercept 501 may be referred to as a frequency threshold 501. The severity threshold 503 and frequency threshold 501 divide the test scenarios 500 into four quadrants—Q1 502, Q2 504, Q3 506, and Q4 508. Q1 502 represents high average dollar amount and low claim volume (i.e., high severity and low frequency). Q2 504 represents high average dollar amount and high claim volume (i.e., high severity and high frequency). Q3 506 represents high claim volume and low average dollar amount (i.e., high frequency and low severity). Q4 508 represents low claim volume and low average dollar amount (i.e., low frequency and low severity). In this embodiment, Q1 502, Q2 504, and Q3 506 together represent test scenarios having a high business impact, whereas Q4 508 represents test scenarios having a high technical impact, since Q4 508 contains the most scenarios, or possible paths.

Figure 6:
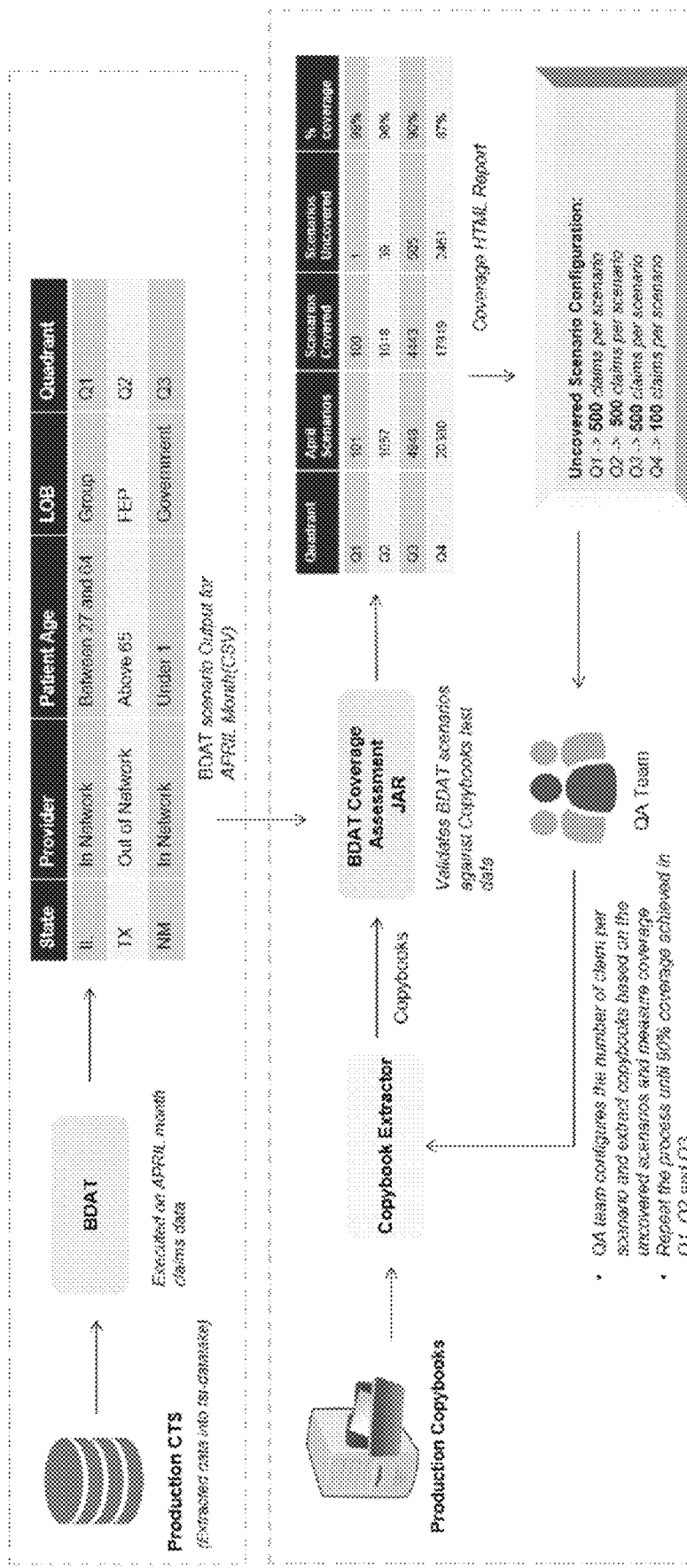
FIG. 6 depicts an exemplary flow chart for the disclosed framework of the system of FIGS. 1A-B.

Once the analytics have been applied to determine test coverage and prioritization of individual test scenarios, the exemplary BDAT framework may then evaluate or define a test suite made up of test scenarios to achieve a predetermined level of coverage in specific quadrants described above with respect to FIG. 5. For example, FIG. 6 depicts an exemplary flow chart for the disclosed framework of the system of FIGS. 1A-B. In the example shown in FIG. 6, the BDAT framework is executed on actual, historical production data. In this case, the BDAT framework is executed on one selected month of existing claims data (e.g., April). The BDAT scenario output for the selected month includes an identification of which quadrant each scenario is in. This output is then fed into a BDAT coverage assessment tool that validates the BDAT scenarios against a test data set extracted from a database of additional historical data (i.e., "Production Copybooks" in FIG. 6). A report, such as a coverage report, may be generated that lists the quadrant, the number of scenarios for the given selected month, the number of covered scenarios, the number of uncovered scenarios, and percent of coverage. A quality assurance team may then review the coverage report to configure the number of claims per scenario. In the example shown in FIG. 6, the uncovered scenario configuration includes quadrant 1 (Q1) having 500 claims per scenario, quadrant 2 (Q2) having 500 claims per scenario, quadrant 3 (Q3) having 500 claims per scenario, and quadrant 4 (Q4) having only 100 claims per scenario. The quality assurance team may extract additional historical data based on the uncovered scenarios, measure coverage, and repeat this process until a predetermined coverage, such as, for example, 90% coverage, is achieved in quadrants Q1, Q2, and Q3.

As discussed above, the disclosed BDAT framework is a configurable analytics framework that leverages big data technologies and applied business concepts to reduce cost, accelerate cycle time, and improve test coverage. The exemplary BDAT framework includes a number of components that work together to evaluate, prioritize, and optimize software test coverage. For example, in an exemplary embodiment of an initial configuration of the disclosed BDAT framework, business dimensions and attributes (i.e., data elements and values) specific to a process consumer are first defined, along with a business-driven grammar, to enhance the test coverage, as illustrated in, and described with respect to, FIG. 3A. Defining the business dimensions and attributes allows for describing types of test scenarios in consistent business terms. Factors to consider during this stage of the framework include whether key system-specific constraints are being delineated, whether business dimensions (i.e., data elements) can be grouped together, and how reliance on fine-grained attributes (i.e., values) can be avoided. Next, existing production data is mapped and extracted based on various data slicing options like date range, health insurance group number, region, etc. (i.e., data elements), as illustrated in, and described with respect to, FIG. 3B. This stage of the exemplary framework provides the ground truth source/test data and how it is defined on a physical level, which allows for grammar assignment and test scenario identification by source. Factors to consider during this stage of the framework include whether the populations of scenarios make sense in a business context, whether errors or undefined and unexpected results are present, and whether frequently used functions, field, or values are missing. An analytics engine of the exemplary framework then performs an algorithmic evaluation of the test scenarios using an analytical model to identify high impact business scenarios providing maximum business dimension coverage, as illustrated in, and described with respect to, FIG. 5. This defines what constitutes business impact and testing value by scenario, leading to a prioritized scenario comparison across sources. Factors to consider during this stage of the framework include whether the distribution of data is spread out in an explainable way and whether "sliced" variables, such as Group Number, are captured. The exemplary framework may then evaluate an existing regression suite or define a new test coverage plan using prioritized scenarios to re-baseline or establish a test suite, as illustrated in, and described with respect to, FIG. 6. This stage of the exemplary BDAT framework identifies what needs to be tested that is not being, or has not been, tested.

In addition to the prioritization discussed above, the exemplary framework disclosed herein may generate continuous insights, based on the tests performed, for a user to determine adaptations to changing business conditions. For example, the proposed system may identify changes in business dimension patterns and shifts in impacts across test scenarios. In one example, a scoring system may be implemented. For example, test scenarios from a series of months may be mapped to a scoring algorithm, where each test scenario is scored based on business impact, occurrence, and consistency. A resulting score may take into consideration ongoing operational data and may reflect how impacts change over time. The business impact portion of the scoring algorithm (i.e., the business impact score) may be expressed as $$\frac{\sum_{n=1}^{m} Weight_n * ImpactClass_n}{\sum_{n=1}^{m} ImpactClass_n}.$$

The occurrence portion of the scoring algorithm (i.e., the occurrence score) may be expressed as $$\frac{\sum_{n=1}^{m} ImpactClass_n}{\text{Number of months}}.$$

The consistency portion of the scoring algorithm (i.e., the consistency score) may be expressed as $$\frac{\sum_{n=1}^{m} Consistency_n * ImpactClass_n}{\sum_{n=1}^{m} ImpactClass_n}.$$

The final resulting score may be expressed as ([business impact score×5]+[occurrence score×4]+[consistency score× 1]), where each of the individual scores (i.e., business impact score, occurrence score, and consistency score) are in a range from 0 to 1, with 1 being a perfect score, and where the individual weighting factors are 5, 4, and 1 for the business impact portion, occurrence portion, and consistency portion, respectively. The scoring system may also involve a rounding factor in order for the final resulting score to be a whole integer between 1 and 10. For example, if each of the individual scores were perfect (i.e., 1), the resulting composite BDAT score would be 10 ([1×5]+[1× 4]+[1×1]=10).

For example, the scoring algorithm discussed above may be applied to 7 months of claims data to evaluate the monthly and full patterns of test scenario impact, occurrence, and consistency. An example summary of total claims, total number of test scenarios, and exemplary values for the severity threshold 503 and frequency threshold 501 are shown below in Table 1.

TABLE 1

Summary of Claim Data

| Analysis Summary | Value |
|---|---|
| Months | 7 |
| Claim Volume | 127.65M |
| Frequency Threshold* | 6419 |
| Severity Threshold* | $10,201 |
| Total Scenarios | 36,637 |

*$80^{th}$ percentile threshold values based on 7 months of claims data.

In this example, the breakdown of the test scenarios into the four quadrants discussed above is shown below in Table 2.

TABLE 2

Test Scenario Quadrant Breakdown

| Impact Quadrant | Scenarios | Total % | Monthly Avg | Monthly % |
|---|---|---|---|---|
| Q2 (High Freq.-High Severity) | 73 | 0.20% | 60 | 0.31% |
| Q3 (High Freq.-Low Severity) | 984 | 2.69% | 784 | 4.00% |
| Q1 (High Severity-Low Freq.) | 6405 | 17.48% | 3328 | 16.98% |
| Q4 (Low Severity-Low Freq.) | 29175 | 79.63% | 15423 | 78.71% |

The results of applying the scoring algorithm to the 7 months of claims data is shown below in Table 3. In this example, scores range from 0 to 10, with the score of 10 indicating the highest impact, occurrence, and consistency. In this regard, test scenarios with scores of 10 would have the most impact.

TABLE 3

Scoring Results
Score (1-10)

| Score | Scenarios | % |
|---|---|---|
| 10 | 25 | 0.07% |
| 9 | 618 | 1.69% |
| 8 | 856 | 2.34% |
| 7 | 921 | 2.51% |
| 6 | 11266 | 30.75% |
| 5 | 4642 | 12.67% |
| 4 | 5516 | 15.06% |
| 0-3 | 12793 | 34.92% |

As shown in Table 3 above, there is a marked difference between test scenarios having scores of 7 and higher and test scenarios having scores between 0-6. In this example, less than 7% of all test scenarios drive the most impact (i.e., scenarios with scores of 7+). In other words, out of 128 MM unique claims, there were 2420 test scenarios to primarily focus on when developing testing coverage. In this example, the reduction of scenarios from total scenarios to the resulting suite of testing scenarios resulting in a compression ratio of 50,000:1.

There may be many use cases for the exemplary BDAT framework disclosed herein, including the initial configuration use case described above. Other common use cases are described below with respect to FIGS. 7-10.

Figure 7:
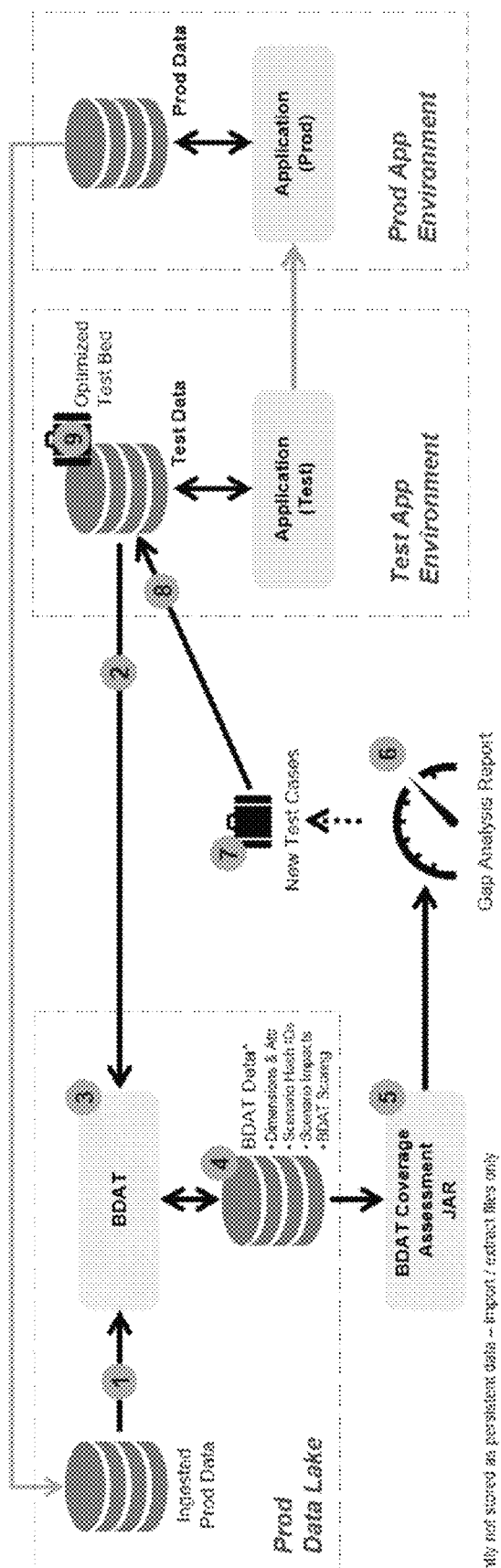
FIG. 7 illustrates an exemplary use case of the disclosed framework for evaluating existing testbeds.

FIG. 7 illustrates an exemplary use case of the disclosed framework for evaluating existing testbeds. The BDAT use case shown in FIG. 7 may be a common use case, which evaluates the coverage of an existing testbed against a current production data profile and BDAT scoring of scenarios, as discussed above. The use case of FIG. 7 may apply to any regression testing activity. As shown in FIG. 7, using a BDAT scenario-based assessment, a production data profile from ingested data can be compared with the existing test case and data bed to optimize and identify new test case needs. In this example, a production data profile is compared with a test data profile to evaluate coverage and identify gaps.

Figure 8:
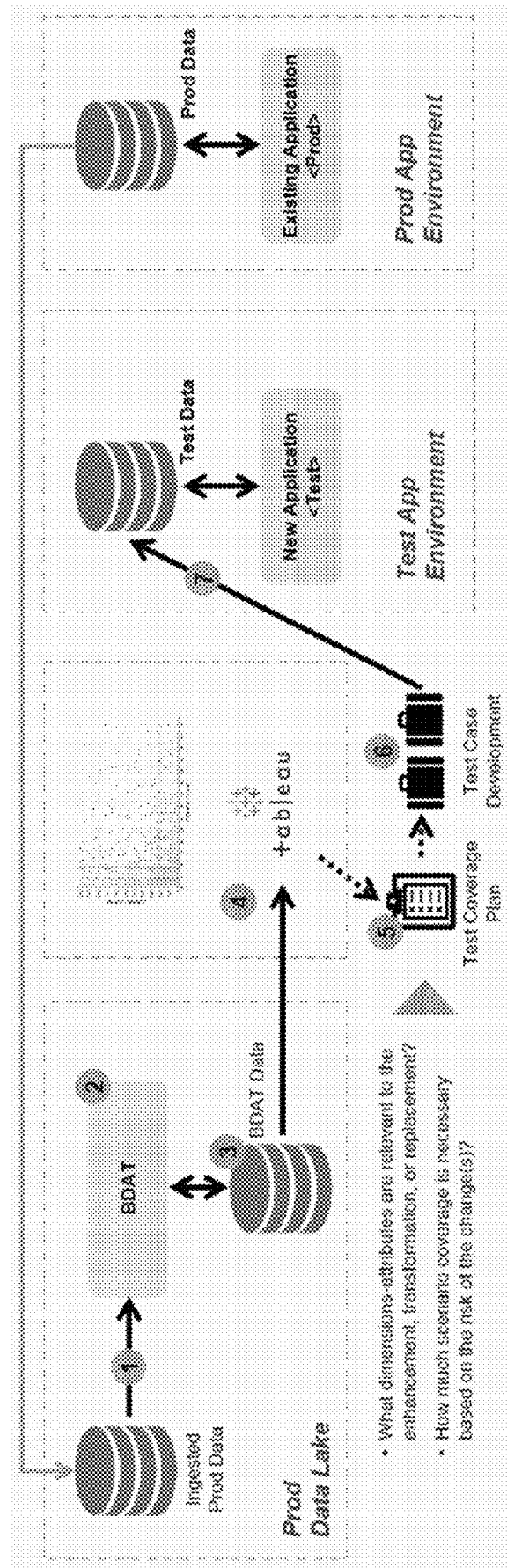
FIG. 8 illustrates an exemplary use case of the disclosed framework for defining a test coverage plan.

FIG. 8 illustrates an exemplary use case of the disclosed framework for defining a test coverage plan. The BDAT use case shown in FIG. 8 is to define a Test Coverage Plan for a major enhancement or transformation of an existing system—or for a replacement of an existing system—which involves defining a Test Coverage Plan with BDAT analysis of a production data profile. As shown in FIG. 8, the BDAT framework may be applied to a production data source to develop a production data profile for testing coverage planning Test cases may then be developed to meet the Test Coverage Plan. Factors to consider for developing the Test Coverage Plan may include determining the relevant dimensions/attributes (i.e., data elements/data values) of the enhancement, transformation, or replacement and determining how much scenario coverage is necessary based on the risk of the change(s). For example, the relevant dimension/attribute pairs may be specified in the request to generate a test for a transaction processing system, as discussed above. Determining the necessary testing scenario coverage based on the risk of the change(s) is described above with respect to FIG. 5. As described above, once analytics have been applied to determine test coverage and prioritization of individual test scenarios, the exemplary BDAT framework may then evaluate or define a test suite made up of test scenarios to achieve a predetermined level of coverage in specific quadrants described above with respect to FIG. 5.

Figure 9:
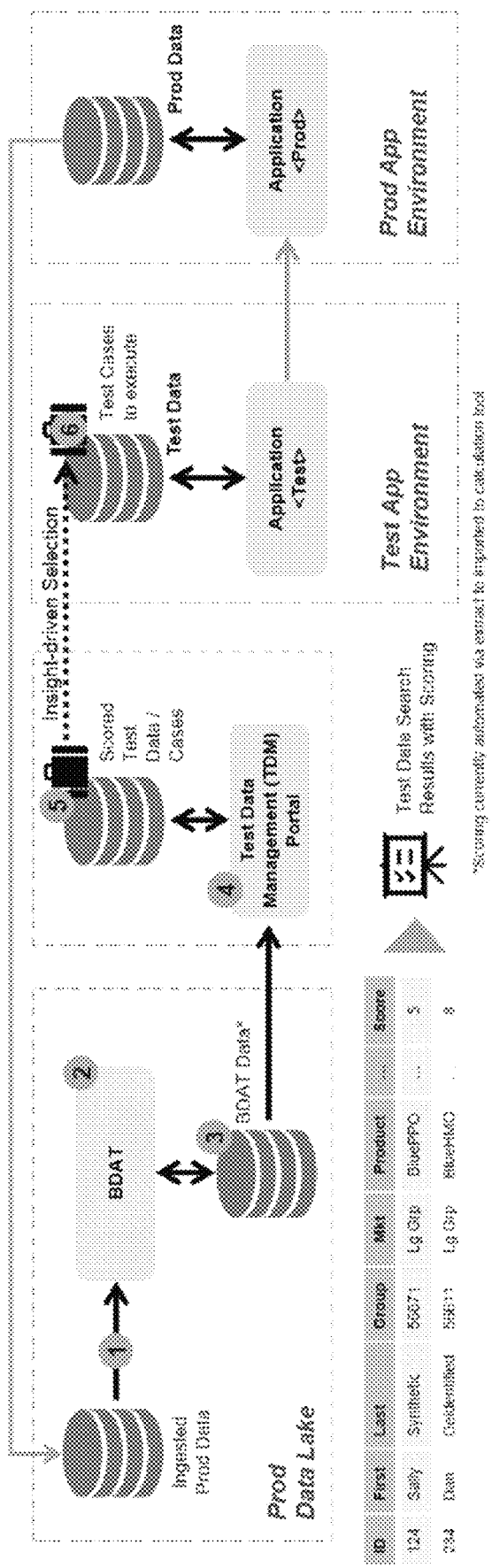
FIG. 9 illustrates an exemplary use case of the disclosed framework for scoring test data or test cases.

FIG. 9 illustrates an exemplary use case of the disclosed framework for scoring test data or test cases. The BDAT use case shown in FIG. 9 is to inject operational insights into test data searches. As an ongoing process, the disclosed BDAT framework may supplement the test data search with the BDAT scores described above for result sets to inject insights from operational impacts into test case data selection. By connecting BDAT scoring by scenario with data records or transactions identified by scenario, search results for test data can have their BDAT scores highlighted to aide in prioritization or selection based on operational impact.

Figure 10:
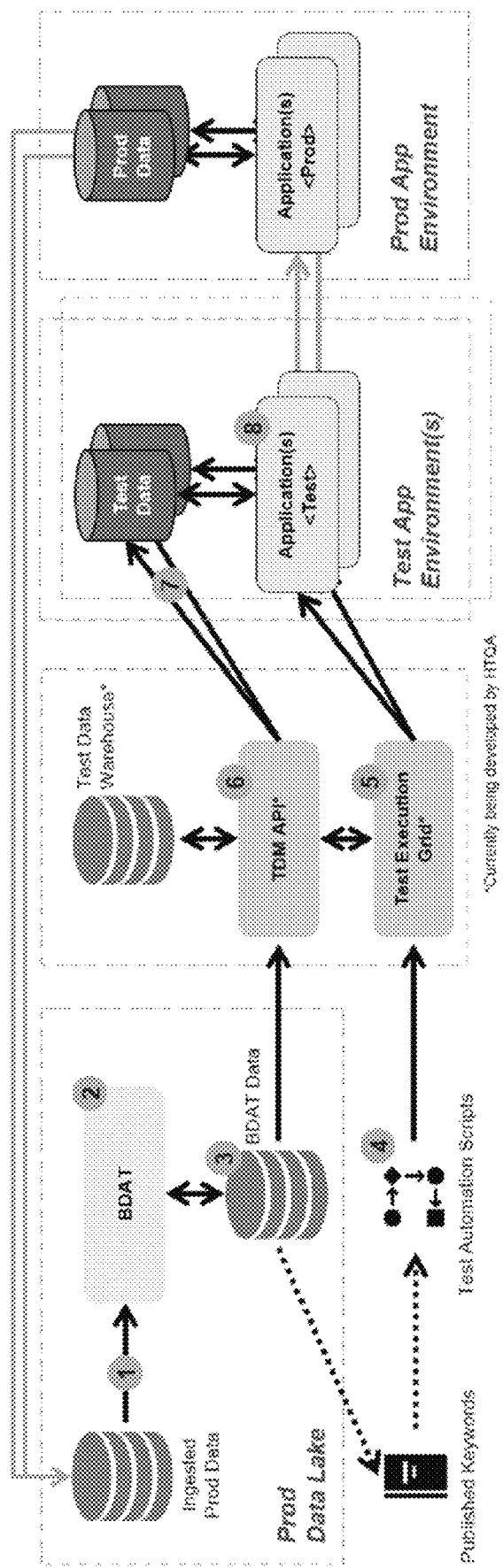
FIG. 10 illustrates an exemplary use case of the disclosed framework for using BDAT data keywords.

FIG. 10 illustrates an exemplary use case of the disclosed framework for using BDAT data keywords. The BDAT use case shown in FIG. 10 is to utilize dimension-attribute pairs (e.g., data element/data value pairs) as broad, logical, data keywords within and across products. Because the common business definitions of dimension-attribute pairs may be leveraged across system-specific physical data, the dimension-attribute pairs may be used as application-spanning ("Cross Product") data keywords. A data keyword capability may be used to identify and load/select data at test runtime.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Reference in this specification to "one embodiment" or "an embodiment" means that a particular feature, structure, or characteristic described in connection with the embodiments is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention

What is claimed is:

1. A computer implemented method comprising:
   receiving, by a processor of a transaction processing testing system, a request to generate a test for a transaction processing system which has been modified from a current state to a modified state, the transaction processing system comprising a processor having an input, an output and a memory coupled therewith, the input operative to receive a transaction comprising a plurality of data elements each having a value, the memory operative to store a plurality of rules, wherein the processor is operative to apply the stored rules to the received transaction, generate, based thereon, a result, and communicate the generated result via the output;
   providing a database stored in the memory coupled with the processor and comprising data indicative of a plurality of previously processed transactions, each transaction of the plurality of previously processed transactions comprising a plurality of data elements previously processed by the transaction processing system prior to being modified, and further including corresponding results thereof, wherein the request specifies a subset of the plurality of previously processed data elements to be tested;
   determining, based on predefined criteria, one or more values of interest for the data elements of the specified subset of the plurality of previously processed data elements of the request;
   identifying one or more subsets of the plurality of previously processed transactions in the database to test based on the specified subset of the plurality of previously processed data elements of the request and the determined one or more values of interest;
   extracting the identified one or more subsets of the plurality of previously processed transactions from the database as a test subset; and
   storing the extracted test subset in the memory.

2. The computer implemented method of claim 1, wherein the test comprises one or more test scenarios, wherein each of the one or more test scenarios comprises a set of data corresponding to an identified subset of the one or more identified subsets of the plurality of previously processed transactions and the corresponding values thereof.

3. The computer implemented method of claim 1, wherein specifying the subset of the plurality of previously processed data elements to be tested comprises automatically identifying previously processed data elements, based on a type of data element, a data element value, a type of transaction, a frequency of occurrence of a transaction or data element in the plurality of previously processed transactions, a type of result generated based on the stored rules being applied to the transactions received by the input of the transaction processing system prior to being modified, a result value, or combinations thereof, specified in the request.

4. The computer implemented method of claim 1, wherein specifying the subset of the plurality of previously processed data elements to be tested comprises automatically identifying previously processed data elements based on a relationship between the previously processed data elements and corresponding values thereof identified in the request.

5. The computer implemented method of claim 1, wherein the request comprises a natural language query having terms, phrases, or concepts associated with one or more types of data elements, one or more data element values, one or more types of transactions, a frequency of occurrence of a transaction or data element in the plurality of previously processed transactions, one or more types of results generated based on the stored rules being applied to the transactions received by the input of the transaction processing system prior to being modified, one or more result values, or combinations thereof.

6. The computer implemented method of claim 5, wherein the natural language query represents the subset of the plurality of previously processed data elements to be tested.

7. The computer implemented method of claim 1, wherein determining comprises analyzing the data elements of the specified subset of the plurality of previously processed data elements to determine, based on a predefined assessment algorithm, specific data element values, data element values above a predetermined upper threshold, data element values below a predetermined lower threshold, data element values within a predetermined range, an average data element value, data element values that occur most frequently in the specified subset of the plurality of previously processed data elements, data element values that occur least frequently in the specified subset of the plurality of previously processed data elements, or combinations thereof.

8. The computer implemented method of claim 1, further comprising testing the transaction processing system in the modified state, the testing comprising:
   causing the transaction processing system in the modified state to process each transaction of the one or more identified subsets of the plurality of previously processed transactions and generate a corresponding test result based thereon;
   comparing the generated test result to the corresponding result of the corresponding transaction previously processed by the transaction processing system in the current state; and
   determining a fault when the generated test result deviates from the corresponding result of the corresponding transaction previously processed by the transaction processing system in the current state.

9. The computer implemented method of claim 8, wherein determining the fault further comprises determining the fault when the generated test result deviates from the corresponding result by a threshold amount.

10. The computer implemented method of claim 8, further comprising:
   when the fault is determined:
      generating a message indicating that the test was unsuccessful; and
      communicating the message indicating that the test was unsuccessful; and
   when the fault is not determined:

generating a message indicating that the test was successful; and communicating the message indicating that the test was successful.

11. The computer implemented method of claim 8, further comprising determining a degree to which the transaction processing system in the modified state is tested.

12. The computer implemented method of claim 8, further comprising computing, based on when the fault is determined, a statistical measure of risk of failure of the transaction processing system in the modified state.

13. The computer implemented method of claim 2, further comprising analyzing the one or more test scenarios to determine, based on a predefined assessment algorithm, a prioritized set of previously processed data records to test.

14. The computer implemented method of claim 13, wherein the prioritized set comprises:
a first subset of previously processed transactions indicative of transactions of low volume associated with a result value above a predetermined threshold;
a second subset of previously processed transactions indicative of transactions of high volume associated with a result value above the predetermined threshold;
a third subset of previously processed transactions indicative of transactions of high volume associated with a result value below the predetermined threshold; and
a fourth subset of previously processed transactions indicative of transactions of low volume associated with a result value below the predetermined threshold,
wherein transaction volume corresponds to a number of unique instances of a transaction present in the plurality of previously processed transactions in the database.

15. The computer implemented method of claim 13, further comprising testing the transaction processing system in the modified state, the testing comprising:
causing the transaction processing system in the modified state to process each transaction of the prioritized set of previously processed transactions and generate a corresponding test result based thereon;
comparing the generated test result to the corresponding result of the corresponding transaction previously processed by the transaction processing system in the current state; and
determining a fault when the generated test result deviates from the corresponding result of the corresponding transaction previously processed by the transaction processing system in the current state.

16. The computer implemented method of claim 13, wherein the predefined assessment algorithm comprises a Frequency-Severity model.

17. The computer implemented method of claim 1, wherein the transaction processing system is an electronic health care insurance claims processing system.

18. A transaction processing testing system comprising:
a data preparer configured to access, from a transaction processing system, data indicative of a plurality of previously processed transactions, each transaction of the plurality of previously processed transactions comprising a plurality of data elements previously processed by the transaction processing system in a current state, including corresponding values thereof that define each corresponding transaction;
a test generator configured to receive a request to generate a test for the transaction processing system that has been modified from the current state to a modified state, and to specify, based on the request, a subset of the plurality of previously processed data elements to be tested; and
a data selector configured to select one or more values of interest for the data elements of the specified subset of the plurality of previously processed data elements to be tested and identify one or more subsets of the plurality of previously processed transactions to test based on the specified subset of the plurality of previously processed data elements to be tested and the selected one or more values of interest.

19. The testing system of claim 18, wherein the test generator is further configured to automatically identify previously processed data elements based on a type of data element, a data element value, a type of transaction, a frequency of occurrence of a transaction or data element in the plurality of previously processed transactions, or combinations thereof.

20. The testing system of claim 18, wherein the request comprises a natural language query having terms, phrases, or concepts associated with one or more types of data elements, one or more data element values, one or more types of transactions, a frequency of occurrence of a transaction or data element in the plurality of previously processed transactions, or combinations thereof.

21. The testing system of claim 18, wherein the data selector is further configured to analyze the data elements of the specified subset of the plurality of previously processed data elements to select, based on a predefined assessment algorithm, specific data element values, data element values above a predetermined upper threshold, data element values below a predetermined lower threshold, data element values within a predetermined range, an average data element value, data element values that occur most frequently in the specified subset of the plurality of previously processed data elements, data element values that occur least frequently in the specified subset of the plurality of previously processed data elements, or combinations thereof.

22. The testing system of claim 18, wherein the test generator is further configured to:
cause the transaction processing system in the modified state to process each transaction of the one or more identified subsets of the plurality of previously processed transactions and generate a corresponding test result based thereon;
compare the generated test result to the corresponding result of the corresponding transaction previously processed by the transaction processing system prior to being modified; and
determine a fault when the generated test result deviates from the corresponding result of the corresponding transaction previously processed by the transaction processing system prior to being modified.

23. The testing system of claim 18, wherein the data selector is further configured to analyze the identified one or more subsets of the plurality of previously processed transactions to select, based on a predefined assessment algorithm, a prioritized set of previously processed transactions or previously processed data elements to test.

24. A transaction processing testing system comprising:
a means for receiving a request to generate a test for a transaction processing system that has been modified from a current state to a modified state, the transaction processing system comprising a processor having an input, an output and a memory coupled therewith, the input operative to receive a transaction comprising a plurality of data elements each having a value, the memory operative to store a plurality of rules, wherein the processor is operative to apply the stored rules to the received transaction, generate, based thereon, a result, and communicate the generated result via the output;

a means for providing a database stored in the memory coupled with the processor and comprising data indicative of a plurality of previously processed transactions, each transaction of the plurality of previously processed transactions comprising a plurality of data elements previously processed by the transaction processing system prior to being modified, and further including corresponding results thereof, wherein the request specifies a subset of the plurality of previously processed data elements to be tested;

a means for determining, based on predefined criteria, one or more values of interest for the data elements of the specified subset of the plurality of previously processed data elements of the request; and a means for identifying one or more subsets of the plurality of previously processed transactions in the database to test based on the specified subset of the plurality of previously processed data elements of the request and the determined one or more values of interest.

* * * * *